(12) United States Patent
Boudreau et al.

(10) Patent No.: US 12,256,678 B2
(45) Date of Patent: Mar. 25, 2025

(54) AUTOMATED MUSHROOM HARVESTING SYSTEM

(71) Applicant: 4AG Robotics Inc., Salmon Arm (CA)

(72) Inventors: Michael Howard Boudreau, Salmon Arm (CA); Kyran Ashley Lawrence Findlater, Salmon Arm (CA); James Boyd Gibson, Salmon Arm (CA); Clark Allan Richardson, Salmon Arm (CA)

(73) Assignee: 4AG Robotics Inc., Salmon Arm (CA)

( * ) Notice: Subject to any disclaimer, the term of this patent is extended or adjusted under 35 U.S.C. 154(b) by 0 days.

(21) Appl. No.: 18/512,597

(22) Filed: Nov. 17, 2023

(65) Prior Publication Data
US 2024/0155985 A1    May 16, 2024

Related U.S. Application Data

(63) Continuation of application No. 17/393,225, filed on Aug. 3, 2021, now Pat. No. 11,856,898.

(51) Int. Cl.
*A01G 18/70*    (2018.01)
*A01G 18/62*    (2018.01)

(52) U.S. Cl.
CPC ............ *A01G 18/70* (2018.02); *A01G 18/62* (2018.02)

(58) Field of Classification Search
CPC ................................ A01G 18/62; A01G 18/70
See application file for complete search history.

(56) References Cited

U.S. PATENT DOCUMENTS 2,853,333 A    9/1958    Littell
2,940,713 A    6/1960    Dusen
(Continued)

FOREIGN PATENT DOCUMENTS

CA    2041824 A1    11/1991
CA    2609122 A1    10/2006
(Continued)

OTHER PUBLICATIONS

Azoyan, "Feasibility Analysis of an Automated Mushroom Harvesting System," 2004, Athens, Georgia.
(Continued)

*Primary Examiner* — Monica L Perry
*Assistant Examiner* — Aaron M Rodziwicz
(74) *Attorney, Agent, or Firm* — Borden Ladner Gervais LLP; Jason Mueller-Neuhaus

(57) ABSTRACT

An automated mushroom harvesting system for mounting to a vertical mushroom rack comprises a robot having a frame mounted to a vertical carriage assembly. A SCARA arm is slidably mounted to the vertical carriage assembly by a vertical stage, operable to move the SCARA arm along a vertical mast. The SCARA arm moves the end effector in a horizontal plane for harvesting mushrooms, above the surface of the mushroom bed and into and out of the confines of the mushroom rack, and the vertical stage moves the SCARA arm in a vertical direction so as to access the mushrooms in a bed and to access mushroom beds on different levels of the vertical mushroom rack. An end effector having a helically reinforced neck and a graduated elasticity modulus, with a lower elasticity modulus in the neck and a higher elasticity in the cup, is also provided.

19 Claims, 20 Drawing Sheets

(56) References Cited

U.S. PATENT DOCUMENTS

| | | |
|---|---|---|
| 3,183,640 A | 5/1965 | Eugene et al. |
| 3,537,495 A | 11/1970 | Pearson |
| 3,568,959 A | 3/1971 | Blaff |
| 3,635,005 A | 1/1972 | Persson |
| 3,765,408 A | 10/1973 | Kawai |
| 4,453,755 A | 6/1984 | Blatt et al. |
| 4,472,929 A | 9/1984 | Maccanna et al. |
| 4,519,193 A * | 5/1985 | Yoshida ............... B25J 9/046 348/89 |
| 4,545,186 A | 10/1985 | Maccanna |
| 4,600,229 A | 7/1986 | Oten |
| 4,768,919 A | 9/1988 | Borgman et al. |
| 4,828,306 A | 5/1989 | Blatt |
| 4,852,926 A | 8/1989 | Littell |
| 4,883,939 A | 11/1989 | Sagi |
| 4,975,016 A * | 12/1990 | Pellenc ............... A01D 46/30 414/730 |
| 5,035,109 A | 7/1991 | van den Top |
| 5,058,368 A * | 10/1991 | Wheeler ............... A01G 18/70 56/13.1 |
| 5,185,989 A * | 2/1993 | Russell ............... A01G 18/70 56/DIG. 8 |
| 5,201,560 A | 4/1993 | Golden |
| 5,234,375 A | 8/1993 | Hendriks |
| 5,344,202 A | 9/1994 | Ramler et al. |
| 5,471,827 A * | 12/1995 | Janssen ............... A01G 18/70 56/13.1 |
| 5,491,965 A * | 2/1996 | Wheeler ............... B65G 47/91 56/327.1 |
| 5,935,136 A | 8/1999 | Hulse et al. |
| 7,185,603 B2 | 3/2007 | Correa et al. |
| 7,204,792 B2 * | 4/2007 | Hagihara ............ B23K 26/1482 483/66 |
| 7,207,609 B2 | 4/2007 | Ilich |
| 7,280,890 B2 | 10/2007 | Seemann |
| 7,281,739 B2 | 10/2007 | Kniss |
| 7,309,089 B2 | 12/2007 | Perlman et al. |
| 7,665,783 B2 | 2/2010 | Nishio |
| 7,854,108 B2 * | 12/2010 | Koselka ............... A01D 91/00 701/50 |
| 8,005,570 B2 | 8/2011 | Gloden et al. |
| 8,033,087 B2 * | 10/2011 | Rapila ............... A01G 18/70 56/13.1 |
| 9,527,115 B2 | 12/2016 | LaRose et al. |
| 9,623,570 B1 | 4/2017 | Krahn et al. |
| 9,730,394 B2 * | 8/2017 | Van De Vegte ......... B25J 9/163 |
| 9,974,235 B2 | 5/2018 | Van et al. |
| 10,654,177 B2 | 5/2020 | Perlman et al. |
| 10,674,666 B2 * | 6/2020 | Moore ............... A01D 46/005 |
| 10,785,912 B2 * | 9/2020 | Moore ............... A01D 46/005 |
| 10,814,498 B2 | 10/2020 | Wagner et al. |
| 10,850,402 B2 | 12/2020 | Wagner et al. |
| 11,154,010 B2 * | 10/2021 | Good ............... B25J 9/026 |
| 2005/0268587 A1 * | 12/2005 | McKeown ............ A01G 18/70 56/10.2 R |
| 2009/0188771 A1 * | 7/2009 | Van Den Top ......... B65B 25/04 198/312 |
| 2009/0320430 A1 | 12/2009 | Rapila et al. |
| 2012/0210553 A1 | 8/2012 | Chen |
| 2012/0279122 A1 | 11/2012 | Benne et al. |
| 2013/0115028 A1 * | 5/2013 | Kremerman ...... H01L 21/67742 414/217 |
| 2013/0149076 A1 * | 6/2013 | Cox ............... B25J 17/02 414/217 |
| 2013/0272823 A1 * | 10/2013 | Hudgens ............ H01L 21/67742 414/217 |
| 2014/0064886 A1 * | 3/2014 | Toshima ............ H01L 21/67742 414/221 |
| 2019/0240813 A1 | 8/2019 | Nakayama et al. |
| 2020/0404845 A1 | 12/2020 | Good et al. |
| 2021/0082104 A1 | 3/2021 | Kashkoush et al. |
| 2023/0044563 A1 | 2/2023 | Boudreau et al. |
| 2023/0150764 A1 * | 5/2023 | Ruehr ............... B25J 9/0009 47/66.6 |

FOREIGN PATENT DOCUMENTS

| | | | |
|---|---|---|---|
| CA | 3111952 A1 | 9/2022 | |
| CN | 107046933 A | 8/2017 | |
| CN | 109081036 A * | 12/2018 | ......... B65G 1/0485 |
| CN | 108812086 B | 5/2020 | |
| CN | 113079954 A | 7/2021 | |
| DE | 10335021 B3 | 11/2004 | |
| EP | 0428284 A1 | 5/1991 | |
| EP | 0596189 A1 | 5/1994 | |
| EP | 3081071 A1 | 10/2016 | |
| GB | 1336393 A | 11/1973 | |
| JP | H0787829 A | 4/1995 | |
| JP | H0957213 A | 3/1997 | |
| JP | 5338984 B2 | 11/2013 | |
| JP | 6300571 B2 | 3/2018 | |
| KR | 100926534 B1 | 11/2009 | |
| KR | 20210035948 A | 4/2021 | |
| NL | 8600887 A | 11/1987 | |
| WO | 9111902 A1 | 8/1991 | |
| WO | 9300793 A1 | 1/1993 | |
| WO | 2006111619 A1 | 10/2006 | |
| WO | 2012161567 A1 | 11/2012 | |
| WO | 2019113691 A1 | 6/2019 | |
| WO | 2020021643 A1 | 1/2020 | |
| WO | 2020097727 A1 | 5/2020 | |
| WO | 2020191483 A1 | 10/2020 | |

OTHER PUBLICATIONS

Cordis EU Project Champi-on 262037 Report, "Fully Automatic System for Picking and Handling Mushrooms for the Fresh Market: From the Growing Bed to the Cooling Storage," 2013, 5 pages. https://cordis.europa.eu/project/id/262037/reporting.
Galley, et al., "Pneumatic Hyperelastic Robotic End-Effector for Grasping Soft Curved Organic Objects," Electronic Thesis and Dissertation Repository, 2019, 143 pages. https://ir.lib.uwo.ca/etd/6392.
International Patent Application No. PCT/CA2021/000057, International Preliminary Report on Patentability, dated Feb. 15, 2024.
International Patent Application No. PCT/CA2021/000057, International Search Report and Written Opinion, dated Apr. 25, 2022.
Mushroom Technological Research Center of La Rioja (CTICH) Web page extract (English version), European Projects, Autol (La Rioja) Spain. https://www.ctich.com/.
Reed, et al., "AE—Automation and Emerging Technologies: Automatic Mushroom Harvester Development," Journal of Agricultural Engineering Research, 2001, vol. 78 (1), pp. 15-23.
Screen Capture from YouTube Video Clip Entitled "Champi-ON Demo Video", 2 pages, uploaded on Sep. 17, 2013 by user Champi-ON Project Project. Retrieved from Internet: https://youtu.be/y44MyQ39d00.
TechBrew, "Changing the Mushroom Harvesting Business", made public by TechBrew Robotics on Apr. 21, 2021 (date verified by Google Wayback Machine), URL: https://web.archive.org/web/20210421150750/https://techbrew.com/mushroom-harvesting-roboV.
New Zealand Patent Application No. 808264, Examination Report dated Mar. 5, 2024.
European Patent Application No. 21095213.5, Extended European Search Report dated Nov. 13, 2024.
International Patent Application No. PCT/CA2024/051175, International Search Report and Written Opinion, dated Nov. 8, 2024.
International Patent Application No. PCT/CA2024/051246, International Search Report and Written Opinion, dated Dec. 17, 2024.
U.S. Appl. No. 18/904,925, Non-Final office Action dated Jan. 15, 2025.

* cited by examiner

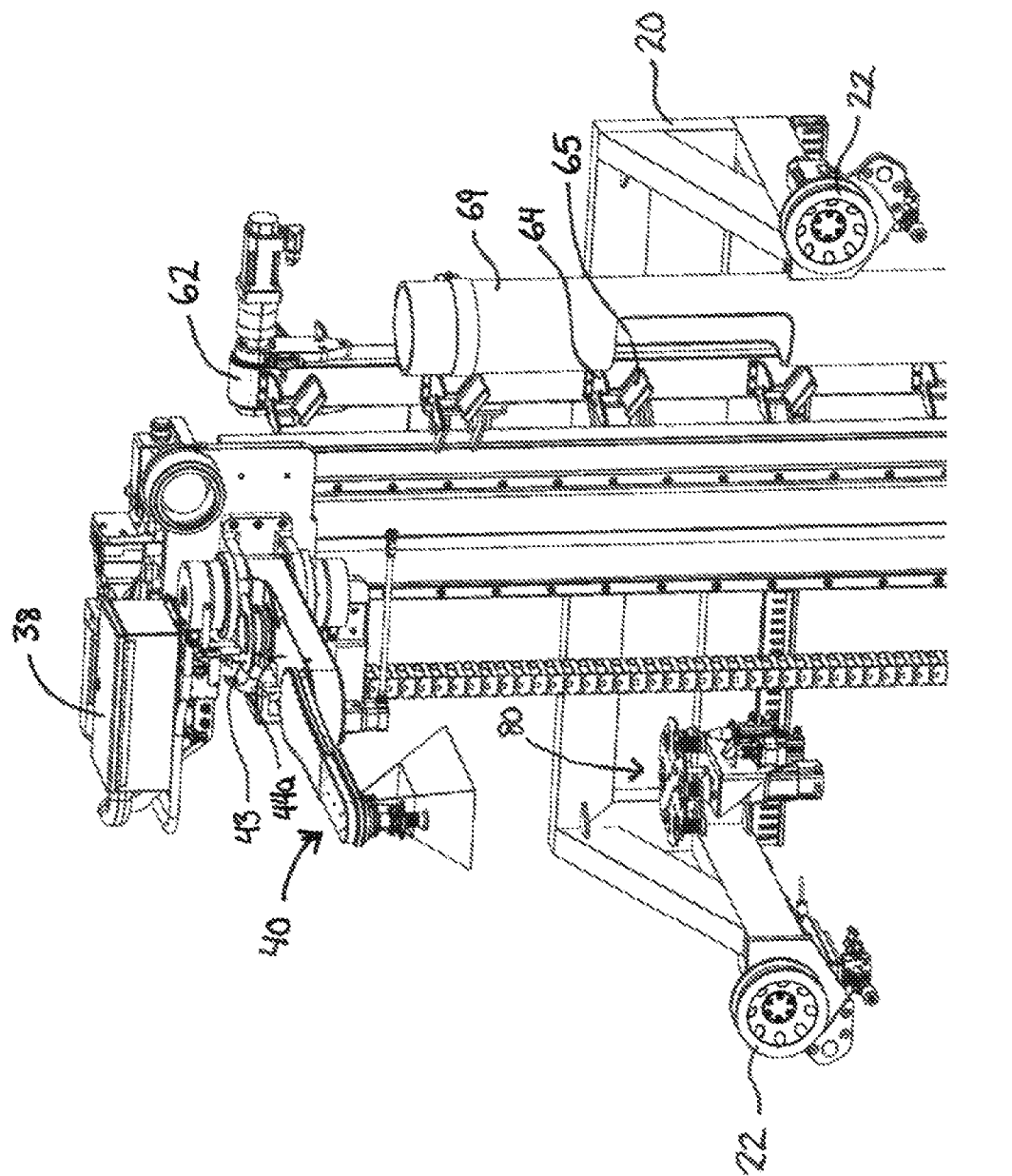

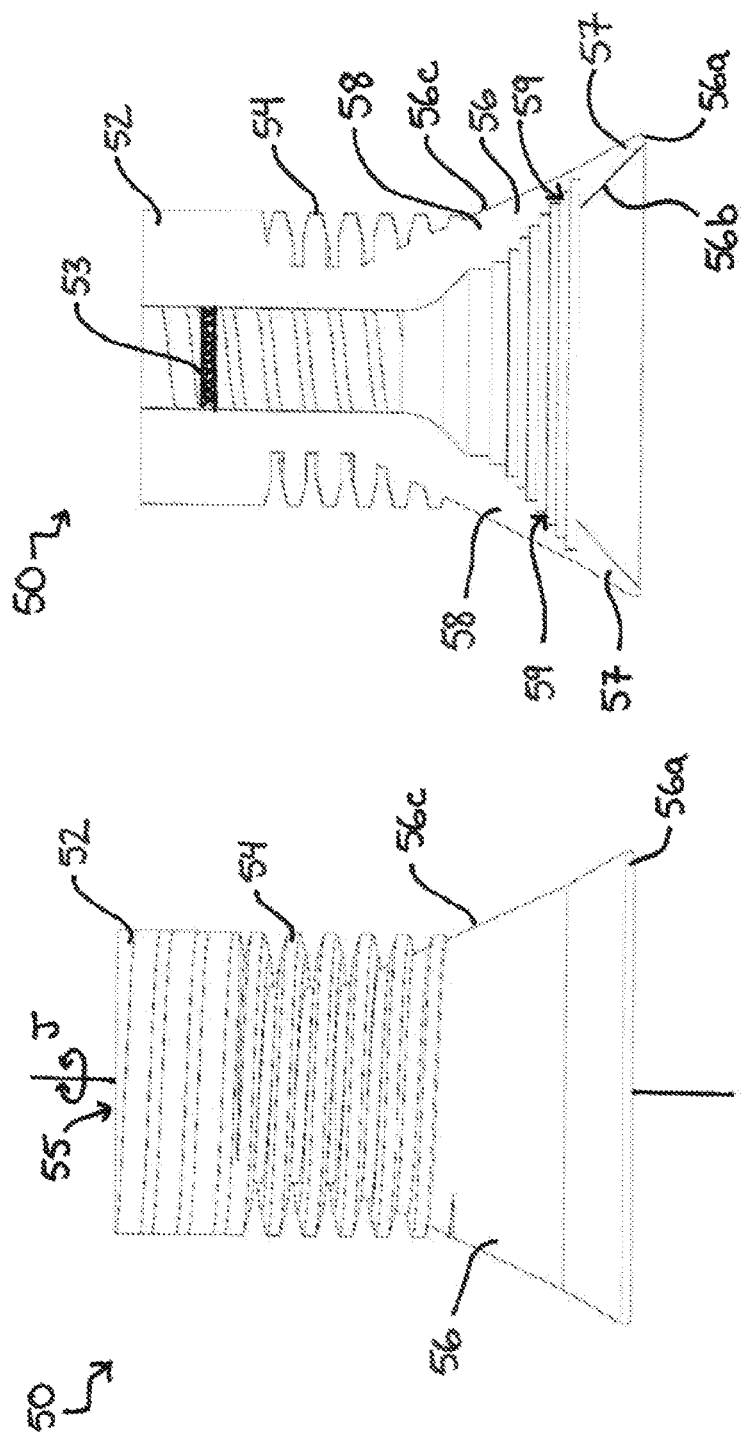

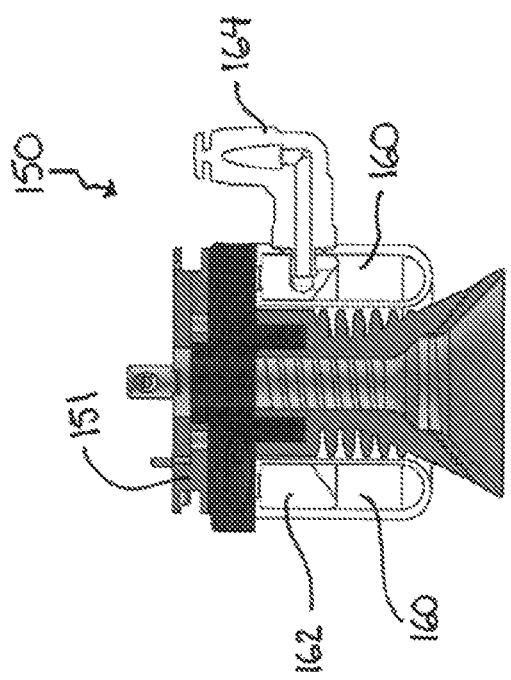
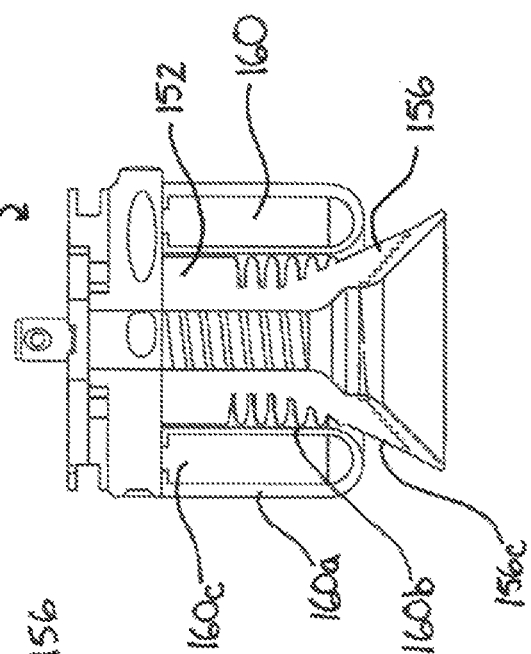
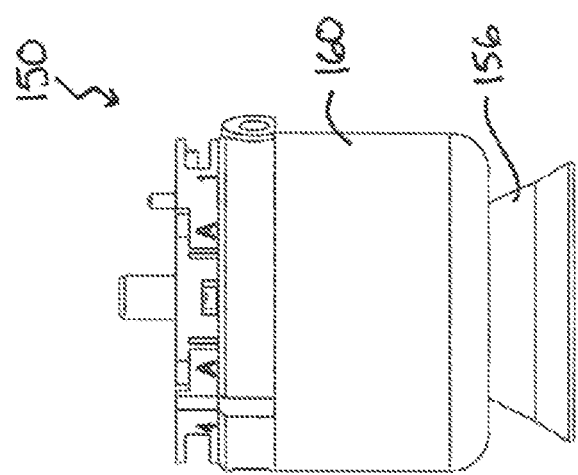
FIG. 20
FIG. 21
FIG. 22

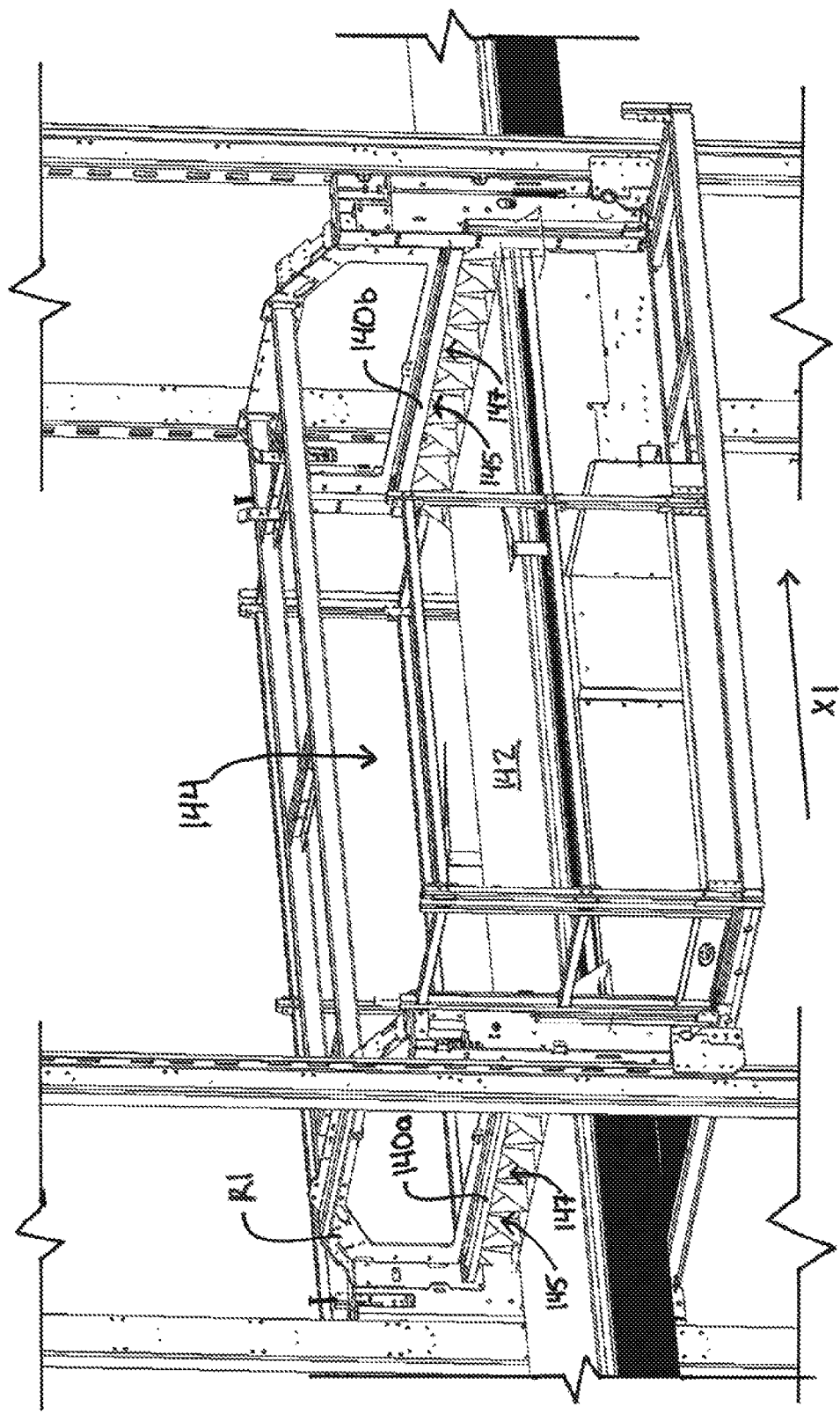

AUTOMATED MUSHROOM HARVESTING SYSTEM

FIELD

The present disclosure relates to systems for automated harvesting of mushrooms; in particular, the present disclosure relates to automated harvesting systems for harvesting mushrooms cultivated within the confines of existing vertical growing racks used in the mushroom cultivating industry.

BACKGROUND

Fresh food market requirements dictate that clean mushrooms, of specific size and maturity, be free of damage. As such, harvesting mushrooms for the fresh food market involves identifying, in a mushroom growing bed, a suitable target mushroom in terms of size and location, and then picking the target mushroom in a manner that does not damage or contaminate it or its neighbours.

In a commercial operation, mushrooms in a growing bed grow on the surface of casing soil over substrate in a series of weekly intervals called flushes. Each flush is picked at least two or three times per day over a five day period, and typically, two to three flushes are harvested. The size at which the mushrooms are picked depends on the market requirements.

European and North American commercial production of the button mushroom typically occurs on "Dutch Style" substrate filled shelves, using a two or three flush cropping cycle. The substrate is typically a composted mixture of wheat straw, animal manures and gypsum. The substrate is pasteurized, inoculated and colonized with spawn of the appropriate mushroom strain. The substrate is covered with a casing soil of peat and lime mixture, in a layer approximately 45 to 50 mm deep, which is then ruffled with compost added to the casing ("CAC-ing") to mix mushroom mycelium into the casing.

The surface of the ruffled casing soil is intentionally made rough or contoured to create micro valleys and hills, resulting in microclimates. The rougher the surface of the casing, the more protected the mushroom pinheads are from fluctuations in the room climate, thereby reducing damage to the mushrooms caused by air flow drying. The rough surface of the casing and the adjacency of other mushrooms may cause the mushroom to grow at angles other than normal to the plane of the shelf on which the growing bed resides. The angles of the cap and stem of the mushroom may be tilted off vertical. Consequently, picking of the mushrooms needs to accommodate "off normal" presentation of the mushroom cap.

Mushrooms lack a protective skin and are susceptible to damage by contact and extreme humidity fluctuations. High relative humidity results in the mushroom becoming sticky and easily yielding tissue that sticks to whatever comes into contact with it during picking. On the other hand, low relative humidity can result in scaling of the mushroom surface, which can also affect the efficiency of means used to pick the mushrooms. Notably, a relatively small amount of pressure or force applied to the mushroom during picking may result in bruising, thereby damaging the mushroom and lowering its value.

Traditionally, commercial mushroom farm operations rely on manual labour to harvest the mushrooms. However, manual labour is costly. Furthermore, in Applicant's opinion, it is difficult to optimize harvesting mushrooms using manual labour. Although the growth rate of individual mushrooms is variable, in general, mushrooms will grow at a rate so that the mushrooms approximately double in size every 24 hours. Using manual labour, each flush is picked only two or three times per day for the duration of the flush, meaning that a mushroom bed may become overgrown between pickings due to the growth rate of mushrooms. To prevent overgrowth of a mushroom bed, ideally a flush would be picked more frequently; however, a higher frequency of picking is difficult to accomplish with manual labour. When a bed becomes overgrown, the mushrooms may run out of room and grow into each other, thereby reducing yield, increasing stem growth, and/or causing deformation of each individual mushroom and thereby adversely affecting the quality and value of the harvested mushrooms.

To the applicant's knowledge, previous attempts at automating mushroom harvesting have been unsatisfactory. Previous attempts have included a mushroom harvesting system mounted within a mobile carriage or frame, which travels horizontally along one level of a vertical mushroom growing rack. For example, international publication no. WO 91/11902 applied for by Steijvers et al discloses mushroom picking units that move along straight or oval-shaped rails mounted within a mobile frame, and the mobile frame travels over a mushroom bed. The picking units are controlled by a programmed scanning camera. The picking units remove the mushrooms from the mushroom bed using a rotary suction cup system. International publication no. WO 2020/097727 applied for by Mycionics Inc. discloses a system for automatically harvesting mushrooms from a mushroom bed. The system comprises a frame for supporting and positioning the system on a mushroom bed, and a control system for directing the picking of mushrooms according to data acquired from the vision system. The system includes a plurality of fingers for gripping the mushrooms to remove the mushrooms from the mushroom bed. The fingers are supported within the mobile frame. U.S. Pat. No. 8,033,087 to Rapila et al discloses an apparatus for picking mushrooms, the apparatus comprising a mobile carriage, at least one picking head supported within the mobile carriage and arranged to move back and forth horizontally, and a suction pad configured to grip the mushrooms for picking. A movable camera or scanner may be arranged to image the mushroom bed. A controlled parallelogram mechanism may lift and lower the suction pad apparatus.

To Applicant's knowledge, attempts to design an end effector r grasping and pulling a mushroom from a mushroom bed, or for grasping other types of produce, are also known. For example, U.S. Pat. No. 5,185,989 to Russell et al discloses a mushroom harvester having a carriage adapted to be moved over a mushroom growing area, with a picking head assembly mounted on the carriage. The assembly includes a pneumatic ram mounted for rotation about its own axis, the ram piston rod being non-rotatable with respect to the ram cylinder. A suction cup is mounted on the lower end of the rod. The ram is controlled to maintain a constant speed of the suction cup as it approaches the mushroom to be harvested, and to ensure the maximum energy of the moving parts of the picking head assembly is below 0.25 Joules. In the international publication no. WO 93/00793 applied for by Janssen et al., a device for harvesting mushrooms, having a picking arm with a picking head coupled with a suction element by means of a bellows coupling member. The suction element has an annular pad consisting of a flexible envelope filled with a deformable material.

U.S. Pat. No. 5,058,368 to Wheeler discloses a mushroom harvesting system, including a picking head having a bellows-like produce gripper through which air is drawn to hold an item of produce securely but gently against an engagement face at the free end of the gripper. The picking head then removes the produce by applying a twisting and lifting action. U.S. Pat. No. 9,974,235 to Van De Vegte et al. discloses a device for harvesting mushrooms having a robotic arm configured to use a plurality of different suction grippers, the suction grippers having different sizes and shapes of suction cups for gripping the caps of different sizes of mushrooms. A control circuit in communication with the suction gripper and a vacuum source automatically adjusts the negative air pressure in the suction gripper in response to harvesting requirements during the harvesting process, so as to maximize the contact with the mushroom caps and minimize the strength of the vacuum required to harvest the mushrooms. U.S. Pat. No. 4,768,919 to Borgman et al, teaches an apparatus for picking up and transferring layers of round produce, such as oranges, comprising movable pickup heads mounted to a carriage. Each pickup head comprises a vacuum cup mounted to a bellows-like construction. The vacuum cup includes a flexible base portion to allow formation of a vacuum seal with the surface of the round produce to be gripped by the vacuum cup.

SUMMARY

The present invention automates picking of cultivated mushrooms for the fresh produce market. In one aspect, an automated mushroom harvesting system comprises a selective compliance assembly robot arm ("SCARA arm") operatively mounted to a vertical carriage assembly positioned adjacent a mushroom bed. A vertical actuator vertically translates the SCARA arm along the vertical carriage assembly to selectively raise and lower the SCARA arm relative to the surface of the casing of the mushroom bed supported on a rack. The SCARA arm has three joints, at the shoulder, elbow and wrist, and two linkages, one between the shoulder and elbow, and the second between the elbow and the wrist.

The rack has multiple levels, each level containing multiple mushroom beds. Each level may be elongate, for example rectangular, so that the rack has at least one long side. The SCARA arm selectively rotates about vertical axes of rotation, at the shoulder, elbow and wrist, in a horizontal plane in an arc of travel, over the mushroom bed casing. An end effector is mounted on the end of the SCARA arm which traverses the travel arc(s). The SCARA arm positions the end effector over a targeted mushroom to be picked, Cameras, sensors or other detectors may be mounted on the SCARA arm to scan the surface of the mushroom bed casing so as to map the mushrooms in the bed and detect which mushrooms are ready for harvesting. To allow for vertical repositioning of the SCARA arm, the SCARA arm is rotated in the horizontal plane so as to move the SCARA arm completely outside the confines of the rack. The SCARA arm may then be elevated or lowered between different vertical levels of the mushroom rack wherein the vertical levels or shelves are stacked vertically in the rack, one above another. Vertical translation of the SCARA arm provides for the arm to access mushroom beds on different levels on the rack.

In one embodiment, the vertical carriage assembly is attached to upper and lower horizontal carriage assemblies. The horizontal carriage assemblies are releasably mountable to outer horizontal rails of the rack. The upper and lower horizontal carriage assemblies may be provided with driven wheels so as to move the system horizontally along the mushroom rack, advantageously along a long side of the rack, to access different mushroom beds supported on each level of the rack, along the length of the mushroom rack.

Advantageously, the vertical carriage assembly is positioned outside the confines of the rack, enabling use of the SCARA arm within the tight confines of so-called Dutch style mushroom shelves, which typically have approximately 10 inches of free space, measured vertically, between the shelves. The vertical spacing is such that it is difficult to fit anything other than the SCARA arm within the confines of the vertical shelf spacing, Movement of the SCARA arm in the horizontal plane, above the mushroom bed, in some embodiments covers approximately 70% of the total bed area. Articulation of the SCARA arm allows positioning of the end effector at any coordinates within the SCARA arm's area of travel. In some embodiments, two or more such automated mushroom harvesting systems may be provided, with the systems positioned for example on opposing sides of the mushroom beds, so as to achieve coverage of 100% of the area of the mushroom bed.

In some embodiments, and as stated above, in addition to the end effector positioned on a distal end of the SCARA arm, the SCARA arm may also include cameras, sensors and lighting systems for scanning the mushroom bed as the SCARA arm travels over the mushroom bed. In some embodiments, the system may be programmed to scan the entire bed prior to picking a flush. In other embodiments, the system may be programmed to scan the bed during the picking of a flush.

In some embodiments, the automated mushroom harvesting system may be configured to work with a different configuration of mushroom growing racks having travelling beds. Such growing room systems include conveyors for conveying mushroom growing beds past a picking area where the manual harvesting occurs. For such grow room configurations, the cameras, sensors or other detectors (collectively referred to herein as the "vision system") may not be mounted on the SCARA arm. Instead, the vision system may be stationary and mounted at a position above the mushroom growing bed conveyor, upstream of the SCARA arm, so as to continuously scan the mushroom growing beds as the beds are conveyed past the vision system. The SCARA arm, in electronic communication with the vision system, would receive instructions for which mushrooms to pick as the conveyor moves the mushroom growing bed past the SCARA arm, downstream of the vision system. In other embodiments, including for traditional Dutch-style growing room configurations with vertical growing racks, the vision system may be mounted to a ruffle-like carriage that is configured to pass over each stationary mushroom bed on the vertical mushroom rack, with the vision system scanning each mushroom bed as it passes over the mushroom beds.

The present disclosure also provides an improved end effector for grasping and picking the mushrooms. In some embodiments, the end effector comprises a flexible cup affixed to a resilient neck, the neck having an inlet for a vacuum line and a helical reinforcing element. The cup and the neck are both formed of silicon rubber, wherein a shore hardness value of the silicon rubber used to manufacture the neck is greater than the shore hardness value of the silicon rubber used to manufacture the cup, resulting in a flexible cup with a stiffer, resilient neck. The helical reinforcing element of the neck provides greater resistance to deformation of the neck in the yaw direction, while enabling flexibility of the cup and the neck in both the pitch and roll directions. Advantageously, the combination of using a harder rubber and a helical reinforcing element in the neck, enables the effective application of force to the mushroom when twisting the mushroom so as to break the mushroom stump away from the mycelium and substrate, while still allowing the neck to deform in the pitch and roll directions so as to enable the cup to conform to a targeted mushroom cap, including the caps of mushrooms having stems that grow off-vertical. Furthermore, the use of a softer, more flexible silicon rubber in the manufacture of the cup portion of the end effector enables sufficient grasping of the mushroom so as to pull it away from the casing, while minimizing damage to the mushroom.

In one aspect of the present disclosure, an automated mushroom harvesting system for mounting to a vertical mushroom rack comprises a first robot having a frame, the frame comprising upper and lower horizontal carriage assemblies and a vertical carriage assembly connected to the upper and lower horizontal carriage assemblies. A SCARA arm is slidably mounted to the vertical carriage assembly by a vertical stage, the vertical stage operable to move the SCARA arm along a vertical mast of the vertical carriage assembly. The SCARA arm comprises a shoulder mounted to the vertical stage, an upper arm pivotally mounted to the shoulder at a first end of the upper arm and a forearm pivotally mounted to a second end of the upper arm at an elbow, the forearm having a free end distal from the elbow and a rotary motor mounted at the free end for releasably mounting and rotating an end effector. When the upper and lower horizontal carriage assemblies are mounted to outer horizontal rails of a vertical mushroom rack, the SCARA arm is movable between a first position located outside an outer edge of the mushroom rack and a second position above a mushroom bed supported within a volume defined by an outer edge of the mushroom rack. In some embodiments the system includes a second robot, wherein the first robot is configured to be mounted to a first side of the mushroom rack and the second robot is configured to be mounted to a second side of the mushroom rack, opposite the first side of the mushroom rack in opposed facing relation to the first robot. A combined area of coverage of the end effector of each of the first and second robots is equal to or greater than 100% of the total area of the mushroom bed.

In some embodiments, the vertical mast of the vertical carriage assembly may extend substantially along a height of the vertical mushroom rack, the vertical mushroom rack having a plurality of levels for supporting a plurality of mushroom beds. The vertical stage moves the SCARA arm along the vertical mast so as to position the SCARA arm above the plurality of mushroom beds located on each level of the plurality of levels of the mushroom rack. The upper and lower horizontal carriage assemblies may include at least one driven wheel and at least one idler wheel, the at least one driven wheel driven by a motor for translating the first robot in a horizontal direction along the outer rails of the mushroom rack.

The SCARA arm may include a harvesting vision system mounted onto or within the forearm of the SCARA arm, proximate the end effector. The harvesting vision system may include at least a camera and a lighting array. In some embodiments, the camera of the vision system includes a 3D camera and a multispectral camera, and the lighting array may be a multispectral lighting array.

In some embodiments, the robot may further include an elevator, the elevator comprising: a vertical conveyor and a plurality of finger assemblies mounted to the vertical conveyor in a spaced-apart vertical array, each finger assembly of the plurality of finger assemblies configured to receive a harvested mushroom from the end effector; a trimming vision system located adjacent the vertical conveyor, the trimming vision system configured to image the harvested mushroom when supported in a finger assembly of the plurality of finger assemblies; and a trimming knife positioned adjacent the vertical conveyor for trimming the harvested mushroom when the harvested mushroom is supported in the finger assembly. The trimming vision system may be in communication with a control system of the first robot, and images obtained from the trimming vision system are provided as inputs to the control system so as to control actuation of the trimming knife to trim a stem of the harvested mushroom. In some embodiments, the images obtained from the trimming vision system are further provided as inputs to the control system so as to validate a prediction of mushroom maturity as determined by the control system based upon a set of images obtained by the harvesting vision system.

In some embodiments, the robot further includes a box filling and handling system located adjacent the vertical conveyor, the box filling and handling system comprising a box conveyor and a box sensor for detecting the location of one or more boxes on the box conveyor. The box filling and handling system conveys boxes filled with harvested mushrooms away from the vertical conveyor and conveys empty boxes towards the vertical conveyor so as to position the empty boxes adjacent the vertical conveyor for receiving harvested mushrooms from the vertical conveyor. The box conveyor may further include a load cell adjacent the vertical conveyor, the load cell in communication with the control system, wherein the load cell detects when the one or more boxes contain a target weight of harvested mushrooms and the control system outputs a control signal to convey the said one or more boxes containing the target weight of harvested mushrooms away from the vertical conveyor and to convey one or more empty boxes towards the vertical conveyor so as to position the one or more empty boxes adjacent the vertical conveyor so as to receive harvested mushrooms.

In some embodiments, the system may include a room conveyance handling system, wherein the room conveyance handling system comprises at least an external conveyor bed located outside a mushroom growing room, a plurality of internal branch conveyor beds located inside the mushroom growing room and a central conveyor bed connected to the external conveyor bed and the plurality of internal branch conveyor beds. The robot may be configured to releasably connect its box filling and handling system to a branch conveyor bed of the plurality of branch conveyor beds, and the central conveyor bed receives filled mushroom boxes from the plurality of branch conveyor beds and conveys the filled mushroom boxes to the external conveyor bed located outside the mushroom growing room. The central conveyor bed receives empty mushroom boxes from the external conveyor bed and conveys the empty mushroom boxes to the plurality of branch conveyor beds so as to transfer the empty mushroom boxes to the box filling and handling system of the robot.

In some embodiments, the system further comprises an apertured waste chute adjacent the vertical conveyor. A waste mushroom picked by the end effector may be deposited into the waste chute so as to direct the waste mushroom to a waste bin. The waste chute may include a plurality of apertures, the plurality of apertures aligned with a plurality of shelves of the vertical growing rack so as to provide access to the waste chute by the end effector when performing picking operations at any shelf of the plurality of shelves of the vertical growing rack.

In some embodiments, the system includes a tool change station comprising a tool rack having a plurality of slots for supporting a plurality of end effectors. The plurality of end effectors includes end effectors of different sizes for harvesting different sizes of mushrooms. The tool rack may include a rotating tool carousel for supporting the said plurality of end effectors. The tool change station may further include a cleaning nozzle for directing a stream of cleaning fluid at an interior surface of the end effector when the end effector is positioned over the cleaning nozzle. The cleaning fluid may include, for example, air, water and/or cleaning solution. The cleaning nozzle may have a conical body and a plurality of apertures spaced apart across the surface of the conical body. When the end effector is positioned over the cleaning nozzle, a plurality of cleaning fluid streams are ejected from the plurality of apertures so as to cleanse the interior surface of the end effector. Optionally, a cleaning nozzle may be mounted to the vertical carriage assembly proximate the SCARA arm for directing a stream of cleaning fluid at an interior surface of the end effector when the end effector is positioned over the cleaning nozzle.

In some embodiments, the robot further includes a single point distance sensor for detecting a frame of the mushroom growing rack so as to avoid collision with the frame when moving the SCARA arm into and out of the mushroom growing rack.

In another aspect of the present disclosure, an end effector for an automated mushroom harvesting system adapted for connection to a vacuum line is provided. The end effector comprises a flexible cup affixed to a resilient neck, the neck including an inlet for a vacuum line and a helical reinforcing element, the helical reinforcing element enabling the neck to deform in a pitch direction and a roll direction while remaining substantially rigid in a yaw direction. The cup has a cup elasticity value greater than a neck elasticity value of the neck. The end effector may include a filter positioned inside a neck cavity of the neck and adjacent the inlet for the vacuum line. The end effector neck may be a cylinder and the cup may be a frustocone. A skirt of the cup may be flared at an angle from a rotational axis passing through the neck and the cup. The end effector may have a gradient elasticity value that gradually increases from a free end of the neck to a rim of the cup. In some embodiments, the shore durometer value of the free end of the neck is substantially 50 and a shore durometer value of the rim of the cup is substantially 10.

In some embodiments of the end effector, the reinforcing element is a metal coiled spring, the metal coiled spring embedded within a cylindrical wall of the neck. Alternately, the helical reinforcing element may be a ridge integrally formed on an outer surface of the neck.

The end effector may be mounted to a tool change latching mechanism for selectively attaching the end effector to a robotic arm of the automated mushroom harvesting system.

In other embodiments of the end effector, the neck is manufactured of a first silicon rubber and the cup is manufactured of a second silicon rubber. The neck includes an extension manufactured of the first silicon rubber, the extension forming an exterior upper portion of the cup, wherein the extension overlaps an interior upper portion of the cup manufactured of the second silicon rubber so as to form an overlapping region of the cup. A modulus of elasticity of the overlapping region is less than a modulus of elasticity of the cup and greater than a modulus of elasticity value of the neck.

The end effector may, in some embodiments, include anti-rebound material in the resilient neck so as to dampen an oscillating motion of the end effector and a mushroom releasably suctioned onto the cup of the end effector as the end effector transfers the mushroom away from the mushroom bed. In other embodiments, the end effector may include a balloon skirt, the balloon skirt comprising an inner wall adjacent to and in contact with an outer surface of at least the neck of the end effector and an outer wall distal from the inner wall and the end effector, the inner and outer walls of the balloon skirt defining an inflatable balloon cavity therebetween, and an air fitting for selectively pressurizing the balloon cavity. When the balloon cavity is pressurized, an oscillating motion of the end effector is dampened as the end effector transfers the mushroom away from the mushroom bed. The inner wall may have an inner wall thickness and the outer wall may have an outer wall thickness, wherein the outer wall thickness is greater than the inner wall thickness. The inner wall of the balloon skirt may be adjacent to and in contact with the outer surface of both the neck and at least a portion of the cup of the end effector.

BRIEF DESCRIPTION OF THE DRAWINGS

FIG. 8 is a perspective view of the upper portion of the mushroom harvesting robot of FIG. 1.

FIG. 9 is a close-up perspective view of an embodiment of the end effector of the mushroom harvesting robot of FIG. 1.

FIG. 10 is a cross-sectional view of the embodiment of the end effector shown in FIG. 9.

FIG. 20 is a front profile view of an embodiment of an end effector surrounded by an inflatable balloon skirt.

FIG. 21 is a sectional front profile view of the end effector surrounded by an inflatable balloon skirt illustrated in FIG. 20.

FIG. 22 is a sectional side profile view of the end effector surrounded by an inflatable balloon skirt illustrated in FIG. 20.

FIG. 23 is a close-up perspective view of a portion of a travelling mushroom bed system with an embodiment of the vision system mounted to the frame of the travelling mushroom bed system.

DETAILED DESCRIPTION

Figure 1:
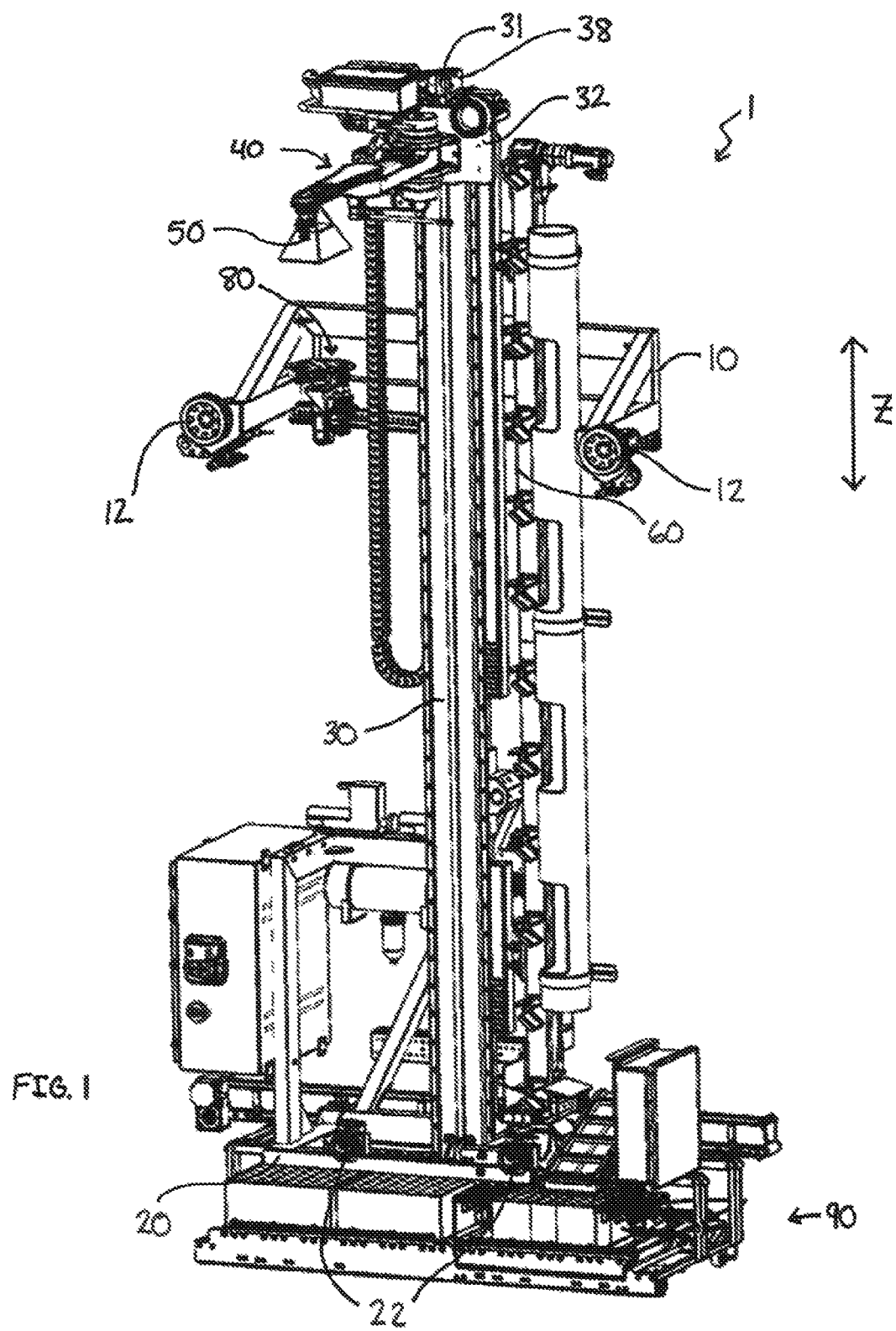
FIG. 1 is a perspective view of an embodiment of the mushroom harvesting robot and box filling system in accordance with the present disclosure.
Figure 2:
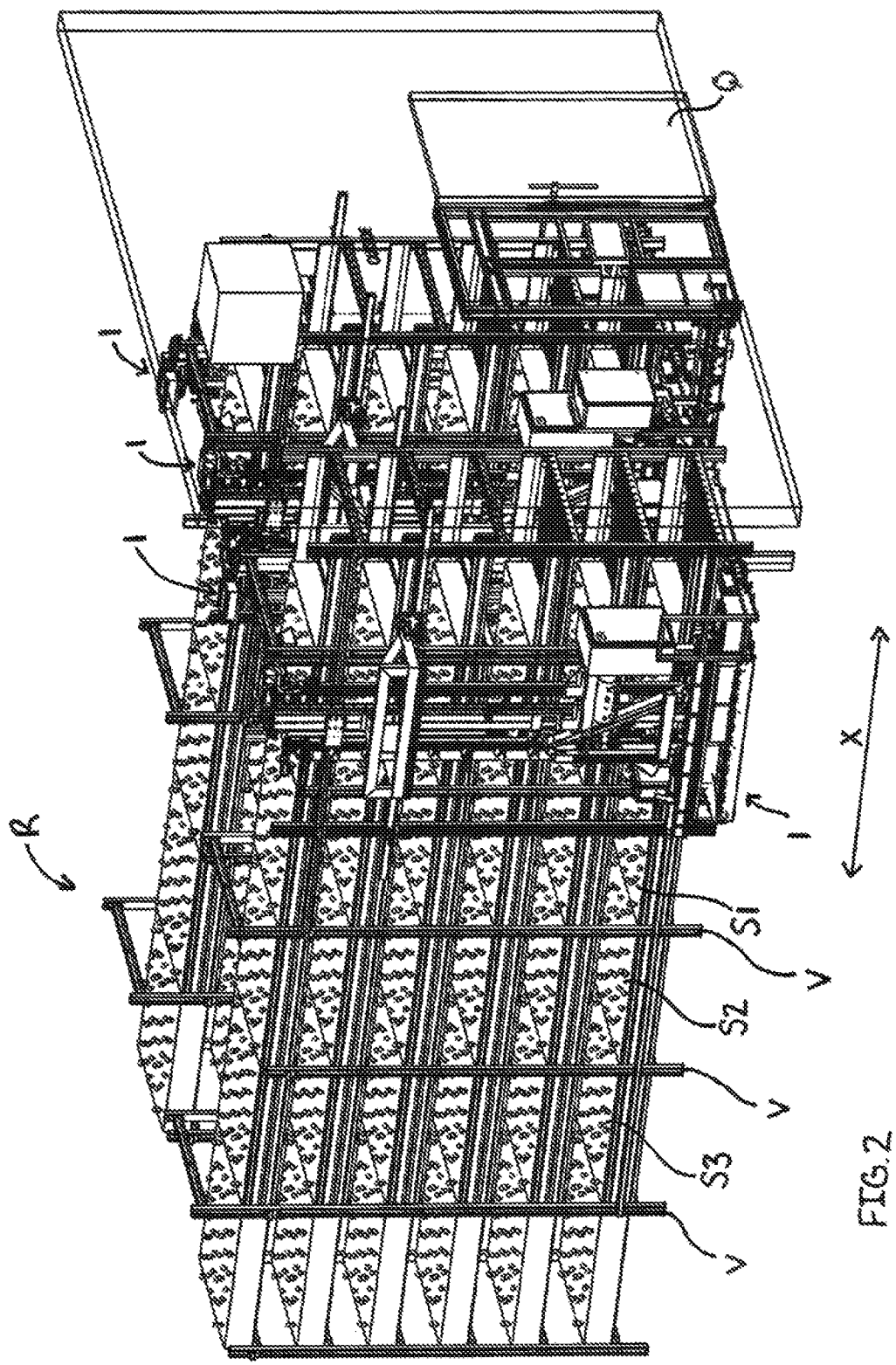
FIG. 2 is a perspective view of a plurality of mushroom harvesting robots of FIG. 1 mounted to vertical mushroom growing racks.
Figure 3:
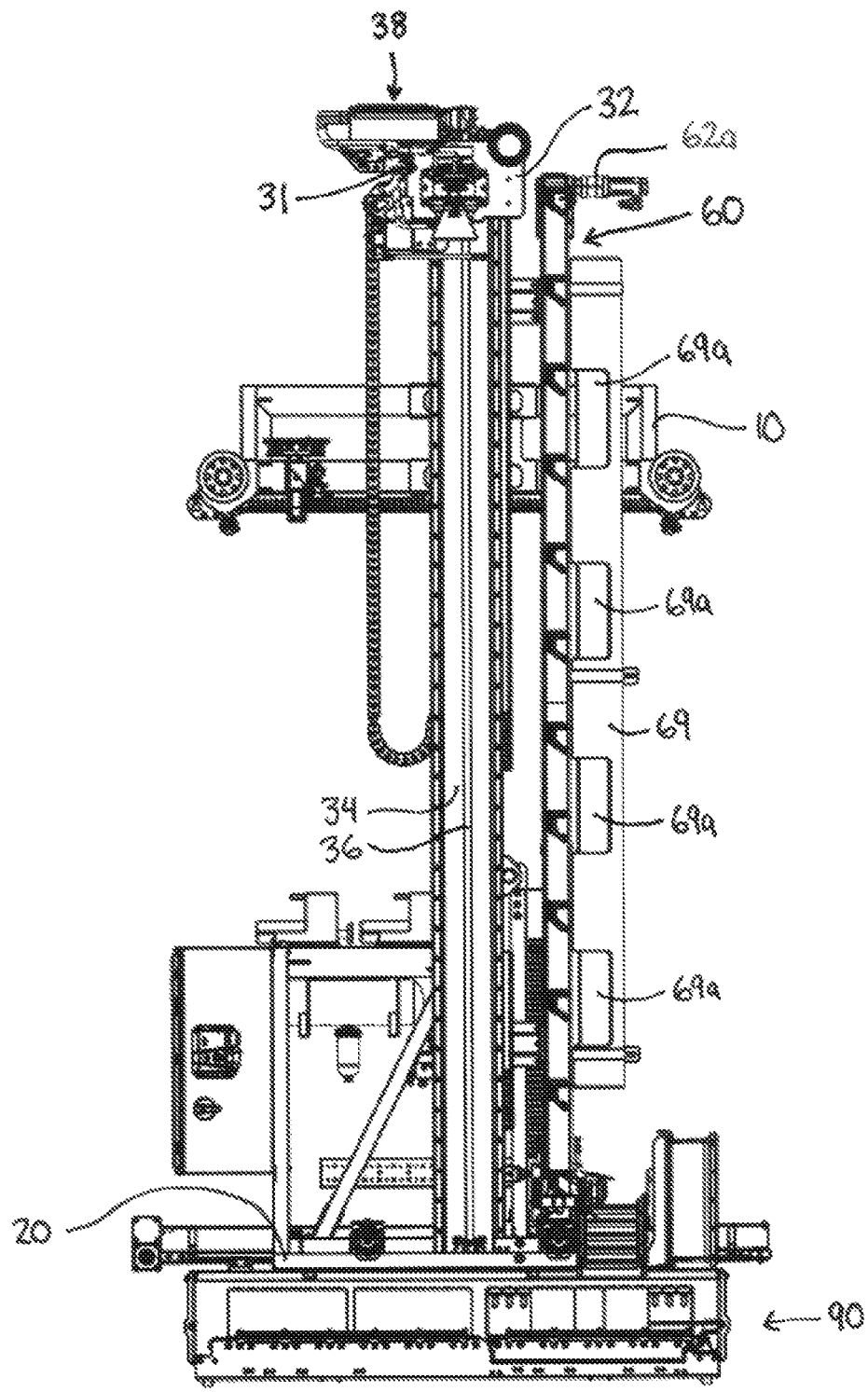
FIG. 3 is a front elevation view of the mushroom harvesting robot and box filling system of FIG. 1.
Figure 4:
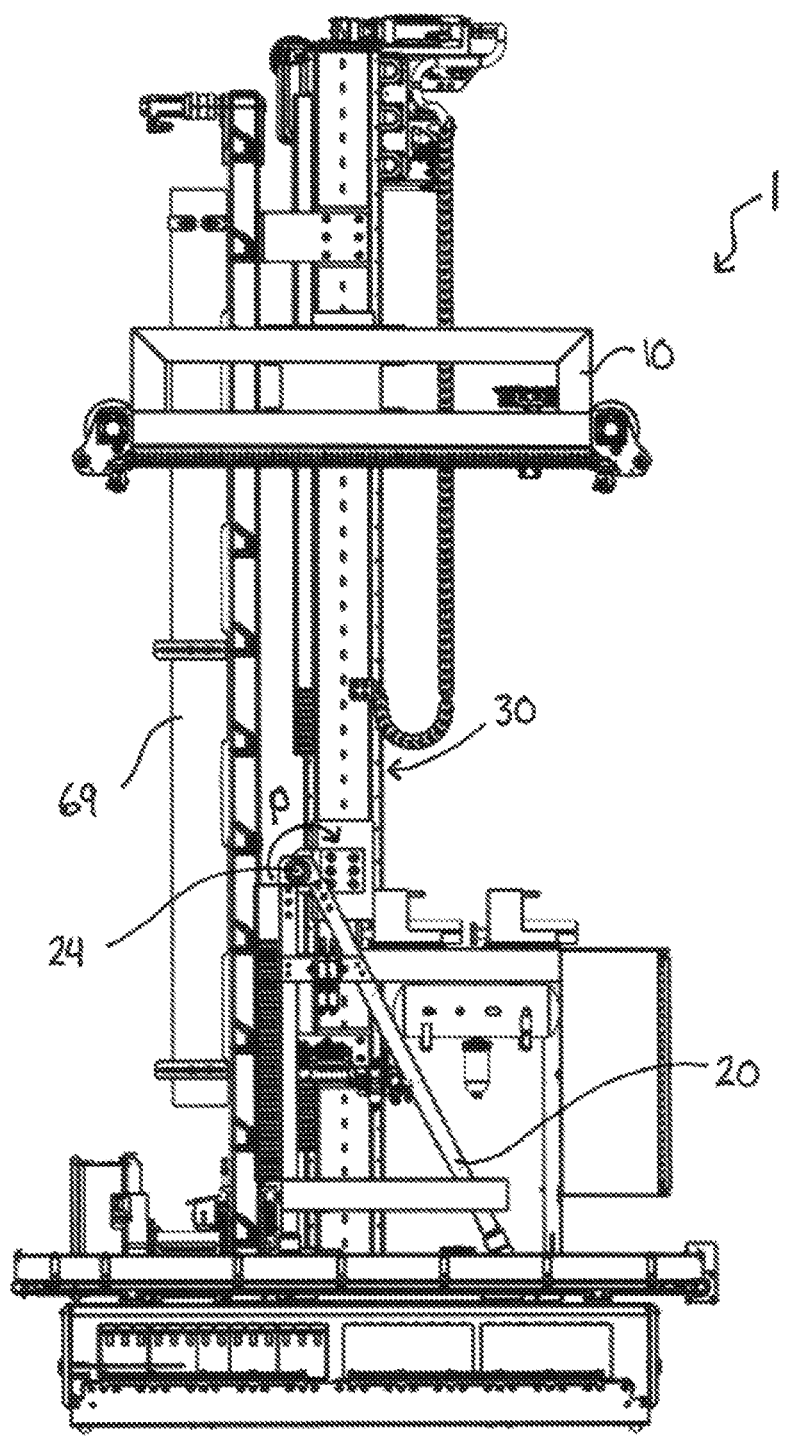
FIG. 4 is a rear elevation view of the mushroom harvesting robot and box filling system of FIG. 1.
Figure 5:
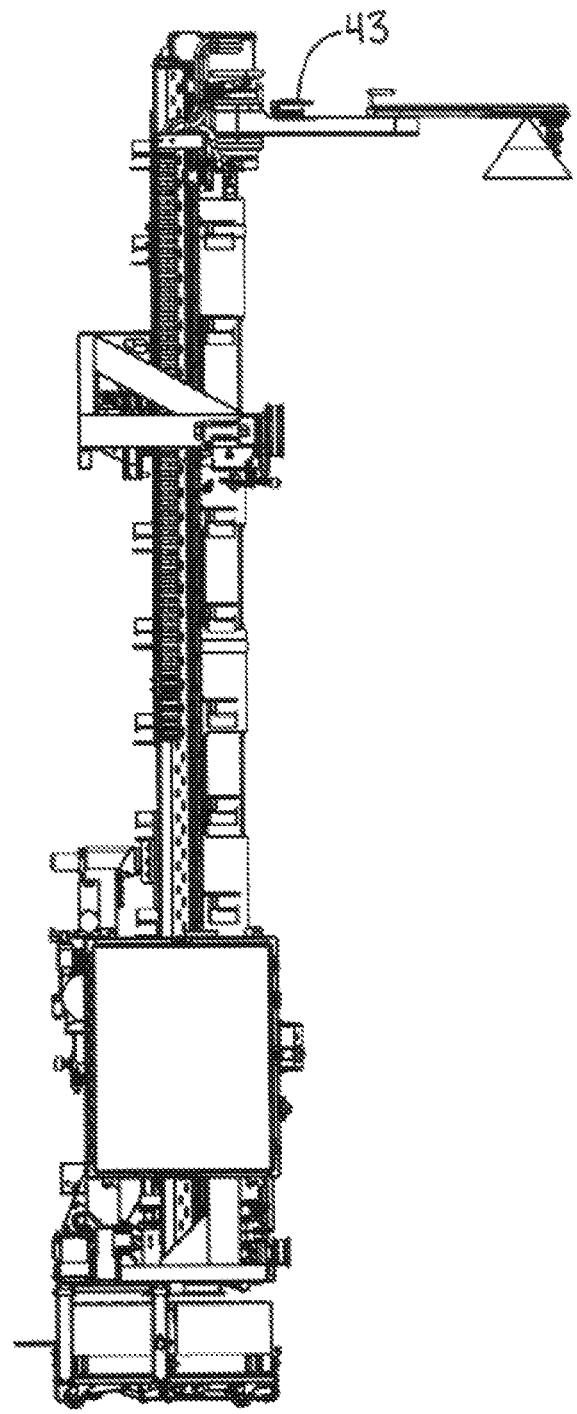
FIG. 5 is a left side elevation view of the mushroom harvesting robot and box filling system of FIG. 1.
Figure 6:
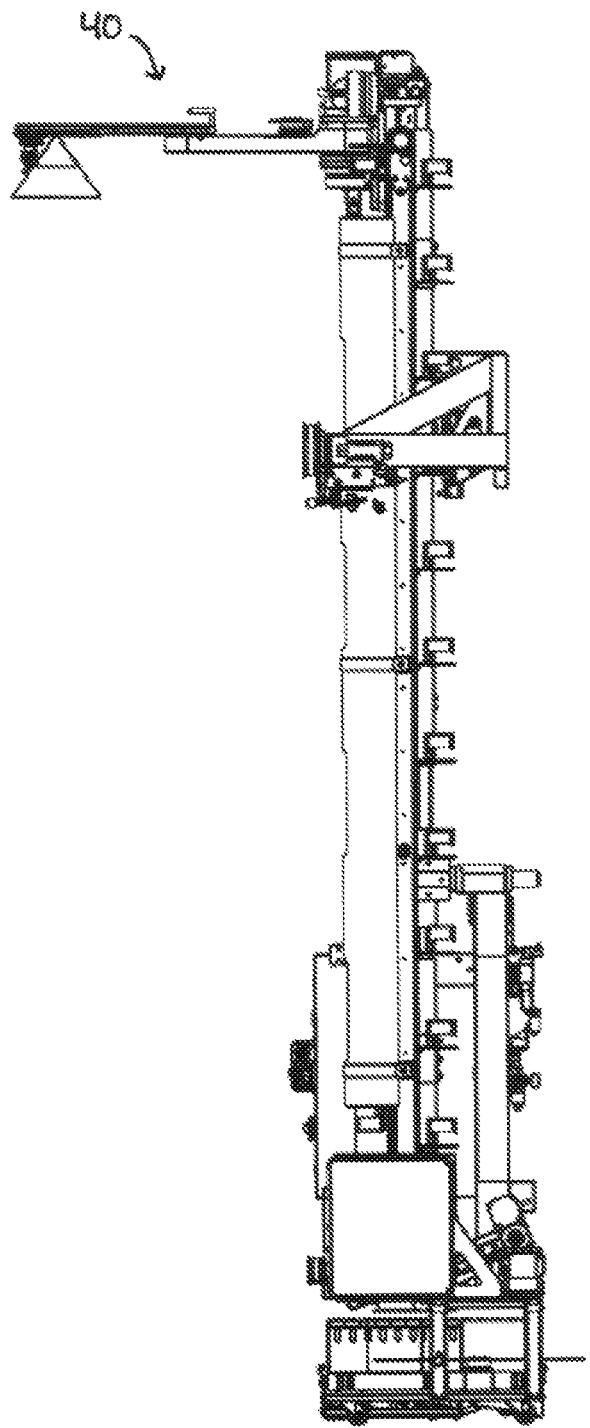
FIG. 6 is a right side elevation view of the mushroom harvesting robot and box filling system of FIG. 1.

The automated mushroom harvesting system for harvesting mushrooms grown in "Dutch style" growing racks, as conventionally used in commercial farming of mushrooms, includes: one or more robots, and in a preferred embodiment, at least two robots, which are arranged in opposing relation on opposite sides of a mushroom growing rack for covering the entire area of each mushroom bed. It will be appreciated that only one robot, or more than two robots, may also be employed. The system may optionally also include a product conveyor for moving harvested mushrooms from each robot to the growing room exit, and for moving empty packaging from the room entrance to the robot loading points. Additionally, the system may also include a waste conveyor for moving the harvesting waste product from the robot to the growing room exit.

With reference to FIGS. 1 to 22, in a preferred embodiment, the robot assembly includes the following subassemblies:

(a) A vertical carriage assembly that supports and moves the SCARA Arm along a vertical axis, so as to access different elevations above the mushroom bed, accomplish vertical picking and placing motions, and to access different shelves in a vertical mushroom rack.

(b) Upper and lower horizontal axis carriage assemblies to support the robot on the growing rack and transport the robot along the length of the rack using a combination of one or more driven and idler wheels that ride on rails fixed to the side of the rack.

(c) An articulated SCARA arm consisting of three vertical, rotational axes at a shoulder, elbow, and wrist of the arm, which rotational axes function together to move the arm and its end effector into, out of, and over the shelf zones between the rack's frame uprights. The SCARA arm is mounted to the vertical axis stage and may be driven by a servo motor to move the arm and its end effector linearly in the vertical directions up and down along the vertical axis assembly. A rotary servo motor at the end to the SCARA arm assembly drives the end effector attached to it via a tool change coupling for the purpose of executing picking functions with the end effector.

(d) The SCARA arm houses a multispectral and 3D vision system camera, as well as a multispectral lighting board, for imaging the mushrooms and growing bed below the arm. Other embodiments may include off-arm vision systems that image the bed independently of the arm, including fixed and/or moving arrays of lighting and cameras. For example, in some embodiments (described below), the vision system may be mounted in a fixed position above a travelling mushroom bed system, and is configured to scan the mushroom bed as the bed is conveyed past the vision system. In other embodiments, the vision system may be mounted to a travelling, ruffler-like carriage, and the carriage may be configured to travel above the stationary mushroom beds on the rack so as to continually scan the mushroom beds. Data gathered by the vision system is then processed and communicated to the SCARA arm to direct the SCARA arm to harvest those mushrooms identified for harvesting or clearing (as the case may be).

(e) The end effector comprises vacuum cups and/or actuated finger assemblies that enable the picking of mushrooms without damage. For embodiments utilizing vacuum cup end effectors, there may optionally be a plurality of vacuum cup end effectors of different sizes for picking different sizes of mushrooms.

(f) A tool change station provides a plurality of end effector tools for the SCARA arm to exchange for the purpose of changing the size and type of tool optimized for a particular mushroom size to be harvested, and to exchange fouled tools for clean tools. The tool change station may also include a tool cleaning station for removing accumulation of debris from the end effector tools stored on the tool change station. In an embodiment, the tool change station may include a servo motor driven rotary platform with a plurality of slots for supporting the plurality of tools. In another embodiment, the tools are supported on a fixed, stationary rack. In some embodiments, there may be a second cleaning station remote from the tool change station, located closer to the SCARA arm, for cleaning the end effector between picking motions.

(g) An elevator comprising a driven vertical conveyor positioned adjacent the vertical axis assembly, the elevator having a plurality of finger assemblies spaced along the conveyor surface for receiving mushrooms picked by the SCARA arm end effector and transporting the picked mushrooms to a box filling and handling system located at the bottom of the robot assembly.

The subassemblies listed above will now be described in detail, in the paragraphs below.

SCARA Arm and Carriage Assemblies

In an embodiment of the automated mushroom harvesting system, illustrated in FIGS. 1 to 15, a mushroom harvesting robot 1 comprises upper and lower horizontal carriage assemblies 10, 20, as well as a vertical carriage assembly 30 mounted to the upper and lower horizontal carriage assemblies 10, 20. The upper and lower horizontal carriage assemblies 10, 20 may include a combination of driven and/or idler wheels 12 on the upper horizontal carriage assembly 10, and a combination of driven and/or idler wheels 22 on the lower horizontal carriage assembly 20. The driven and idler wheels of the upper and lower horizontal carriage assemblies are configured to be mounted to outer rails of the mushroom growing racks R, as shown for example in FIG. 2. It will be appreciated that different combinations of idler and driven wheels on the upper and lower horizontal carriage assemblies 10, 20 may work and are included in the present disclosure. For example, not intended to be limiting, the upper horizontal carriage may include two driven wheels and the lower horizontal carriage may include two idler wheels; alternately, the upper horizontal carriage may include one driven wheel and one idler wheel and the lower horizontal carriage may include two idler wheels, or both the upper and lower carriage assemblies may each include both an idler wheel and a driven wheel. The upper and lower horizontal carriage assemblies enable the mushroom harvesting robot to travel in a horizontal direction X along side of the mushroom rack R on which the robot 1 is mounted. In this manner, the mushroom harvesting robot 1 may move from section to section of the rack are in order to access mushrooms growing in each section, such as the mushroom robot accessing adjacent mushroom sections S1, S2 and S3 as the robot travels along a side of the rack are in horizontal direction X, as shown for example in FIG. 2.

The vertical carriage assembly 30 includes a carriage plate 32. The carriage plate 32 is slidably mounted to a vertical mast 34 supporting a carriage belt 36. The carriage motor 38 operates the carriage plate 32 so as to slide it up and down the vertical mast 34 along the carriage belt 36 in vertical direction Z. Thus, the vertical motion of the end effector 50, supported on the end of a SCARA arm 40 mounted to the carriage plate 32, is controlled by means of the motor 38 actuating the carriage belt 36 and corresponding carriage plate 32 in direction Z.

Figure 7:
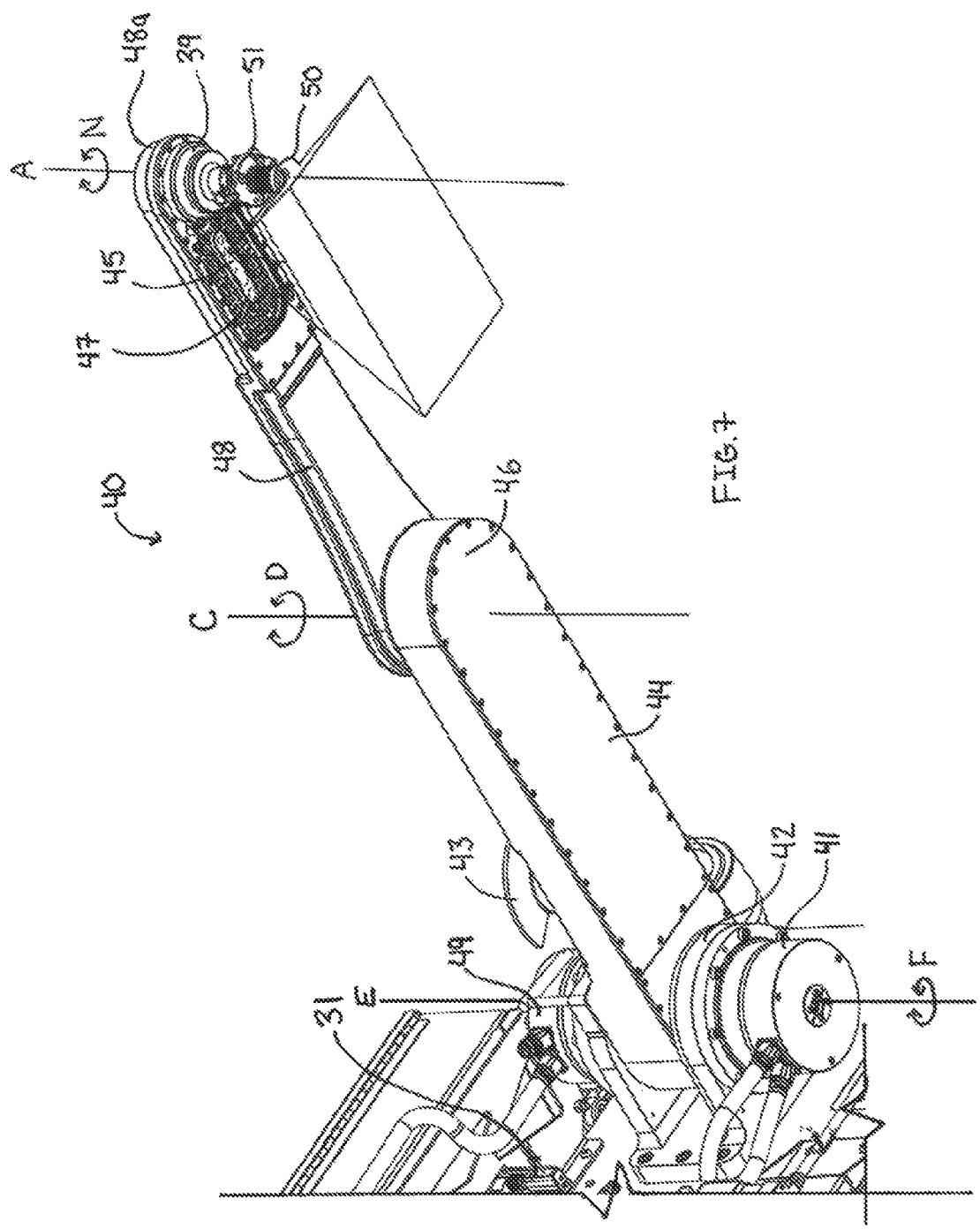
FIG. 7 is a bottom perspective view of a portion of the SCARA arm of the mushroom harvesting robot of FIG. 1.

As best viewed in FIG. 7, the SCARA arm 40 comprises a shoulder 42, an upper arm 44 pivotally mounted to the shoulder 42, an elbow 46, and a forearm 48 pivotally mounted to the upper arm 44 at the elbow 46, An end effector 50 is releasably mounted to the free end 48a of forearm 48. For example, the end effector 50 may be mounted to the free end 48a of the forearm 48 by a tool change mount 51 between the free end 48a of the forearm and the end effector 50. A rotary wrist motor 39 is operable to rotate or twist the end effector 50 about rotational axis A in rotational direction N, for example as shown in FIG. 7, As will be further explained below, this enables the SCARA arm to apply a twisting motion to a mushroom held by the end effector 50 during picking operations.

A rotary motor 41 is also provided for rotating the elbow joint 46 about the rotational axis C in rotational direction D. In the embodiment illustrated in FIG. 7, the elbow motor 41 is mounted proximate the shoulder joint 42, and a chain or belt (not shown) is mounted within the upper arm 44 and operatively connected to the elbow joint 46 and the elbow motor 41 so as to transfer the rotational motion of the rotary motor 41 to the elbow joint 46 to rotate the elbow 46 about vertical axis C. The configuration illustrated in FIG. 7 thereby reduces the vertical size of the elbow joint 46 and also reduces the overall weight of the cantilevered portion of the SCARA arm 40 that sweeps over the mushroom bed. However, it will be appreciated by a person skilled in the art that other embodiments may include a rotary motor 41 mounted proximate the elbow joint 46 for rotating the elbow 46 about axis C, and such embodiments are included in the present disclosure.

Rotary motor 49 is provided for rotating the shoulder 42 about rotational axis E in rotational direction F. As will be appreciated by person skilled in the art, the SCARA arm 40 thereby provides for moving the end effector 50 over the area swept by the SCARA arm when fully extended, which advantageously may be a large portion of, or substantially the entire surface area of, a given mushroom bed during picking operations, limited only by a horizontal plane arc of travel provided by the shoulder 42 rotating about its rotational axis. For example, in some embodiments such as illustrated in the schematic diagram of FIG. 19, the arc of travel 110a, 110b, 110c may be 180 degrees, thereby covering substantially 70% of the surface area of a given mushroom bed. The degrees of freedom provided by a combination of the shoulder 42 and the elbow 46, enable the end effector 50 to be positioned over and access any mushroom within the surface area covered by SCARA arm 40.

Figure 19:
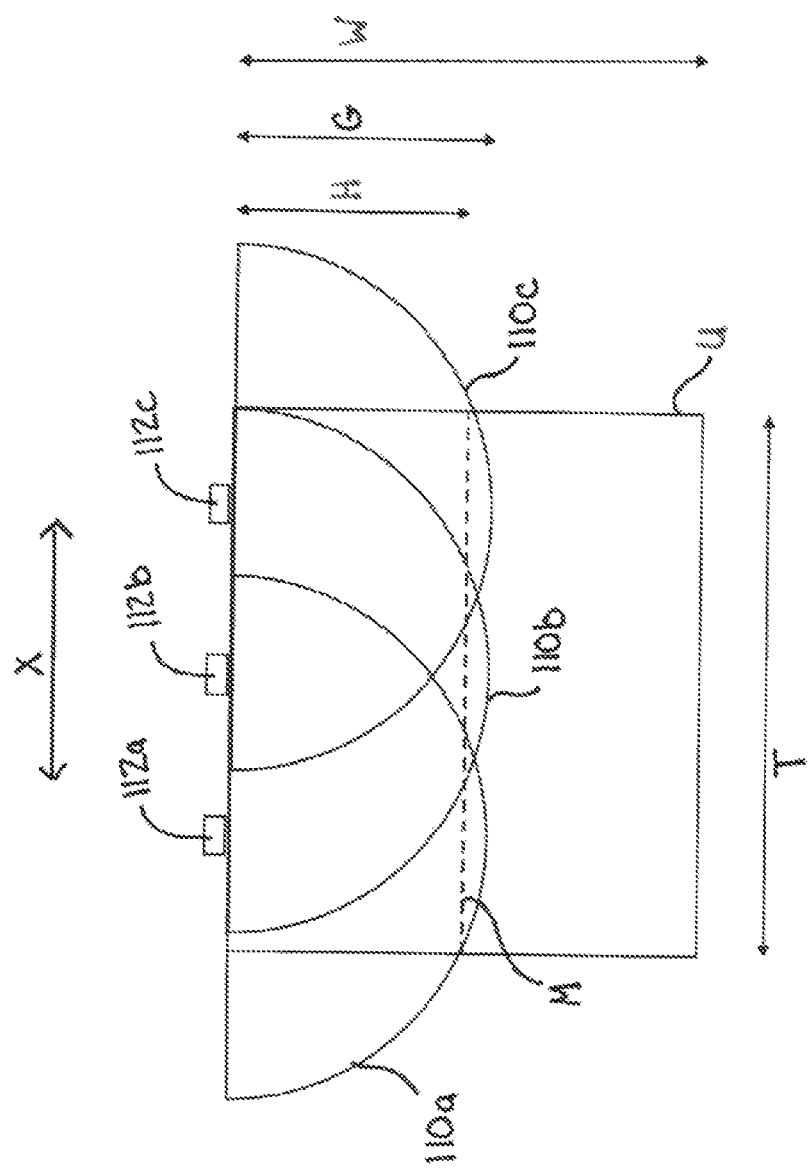
FIG. 19 is a schematic diagram illustrating the area of a mushroom bed covered by the SCARA arm of an embodiment of the mushroom harvesting robot disclosed herein.

As an illustrative example not intended to be limiting, with reference to FIG. 19, a typical section U of a mushroom bed may have a length T of 140 cm and a width W of 140 cm, these measurements being the distances between adjacent vertical legs or posts V of the mushroom rack R, When performing scanning operations with a vision system mounted to the SCARA arm 40, the robot 1 may in position 112a when performing a first scan of the bed section U, with the travel arc 110a sweeping over a portion of section U. The midway point M of the width W would be, in this example, 70 cm from one edge of the rack, whereas the radius G of the arc of travel 110a may be slightly longer than the midway point M of the width W; for example, the radius G may be approximately 103 cm. In the illustrative example, after a first scan is completed by the SCARA arm, the robot moves in direction X to a second position 112b, and performs a second scanning operation with the SCARA arm as shown by the arm's arc of travel 110b. The robot may then move once again to position 112c to perform a third scanning operation, represented by the arm's arc of travel 110c. As shown in FIG. 19, the three arcs of travel 110a, 110b and 110c are overlapping. By combining the images obtained during each overlapping scanning operation, the robot 1 covers an entire one half of the area of the mushroom bed U. In other embodiments, the robot may be configured to travel in direction X during a continuous scanning operation, thereby imaging section U with the SCARA arm extended in different positions over the section U. In such embodiments, imaging system may include an array of cameras and lighting supported along the length of the SCARA arm, so as to scan different portions of section U as the robot 1 travels along the section U in direction X.

It will be appreciated that, in some embodiments, a second robot 1 may be deployed on the opposite side of the mushroom bed U, opposite from the positions 112a, 112b and 112c of the first robot, and the second robot may cover the entire second half of the mushroom bed U by performing a similar set of overlapping scans from the opposite side of the mushroom bed U, to thereby cover the entire mushroom bed. It will also be appreciated that, rather than deploying two robots to simultaneously scan the same mushroom bed U, an operator may optionally scan a first half of the mushroom bed U, and then move that same robot to the opposite side of the mushroom bed U so as to scan the entire second half of the mushroom bed U. It will also be appreciated that the dimensions discussed above are not intended to be limiting; for example, sections of mushroom beds U may have larger or smaller dimensions than as discussed above, and similarly, the radius of the arc of travel G may be configured to be shorter or longer, depending on the design of the SCARA arm.

Advantageously, the combination of a SCARA arm, providing for motion of the end effector in a horizontal plane, with a gantry-style vertical carriage assembly 30, which provides for motion of the end effector in a vertical plane, enables the use of the mushroom harvesting robot 1 to automate the harvesting of mushrooms grown in the traditional Dutch style mushroom growing racks, which only have a clearance of typically 10 to 11 inches from the surface of the bed to the next mushroom rack shelf located above the bed. Because of this space limitation, in the Applicant's experience, it is difficult to use robotic arms designed with both horizontal and vertical ranges of motion while remaining within the confines of the traditional mushroom rack structure, Instead, the SCARA arm of the present invention enables coverage of nearly the entire surface of mushroom bed, in a horizontal plane, while adjustments to the vertical height of the SCARA arm and the end effector are provided by the vertical carriage assembly 30 located entirely outside the frame of the mushroom rack. In contrast, the Applicant has found that providing for both horizontal and vertical movement, entirely on the robotic arm structure that is working within the tight space confines of the mushroom rack, is difficult to accomplish and not practical due to the space constraints. To cover the rest of the area of the mushroom bed that is not accessible by the SCARA arm of a first robot 1, in some embodiments a second robot 1 may be provided, which may be positioned in opposing relation to the first robot on the other side of the mushroom growing rack. In this manner, two robots each having a SCARA arm with the same range of coverage over the mushroom bed, would together cover the entire area of the mushroom bed, with some overlapping coverage as between the two robots.

Furthermore, in other embodiments and depending on the exact configuration of the growing rack, it will be appreciated by person skilled in the art that other robots with different configurations, for example having longer SCARA arms, may be designed so as to cover the entire mushroom bed using only a single robot, and it will be appreciated that such embodiments are intended to be included in the scope of the present disclosure.

As may best be seen in FIGS. 7 and 8, the SCARA arm may include a distance sensor for detecting the frame of the vertical mushroom rack R. For example, not intended to be limiting, the distance sensor 43, may be a lidar sensor, which provides for single-point or multi-point distance measurement between the lidar sensor 43 and the frame of the mushroom rack R. In some embodiments, such as shown in FIG. 7, the lidar sensor 43 may be mounted adjacent shoulder 42, for example on an upper surface 44*a* of the upper arm 44, The degrees of freedom of motion provided by the structure of the SCARA arm 40 enable SCARA arm 42*h* to be folded in a position completely outside of the frame of mushroom rack R when the robot assembly 1 is mounted to the mushroom rack R. Advantageously, this enables the SCARA arm to be folded out of the way when the robot is translating in horizontal direction X along the rack R, for example to move from one section to another section of the mushroom rack, without the SCARA arm 40 interfering with the vertical legs V of the mushroom rack R.

Vision System

In some embodiments, the SCARA arm 40 includes a 3D and/or a multispectral camera 45 and a multispectral lighting array 47 mounted to the lower side 48*b* of the forearm 48. Thus, the SCARA arm 40 may be used to scan the mushroom bed using the camera 45 and the multispectral lighting array 47, prior to commencing harvesting operations. The camera 45 records a series of images as the SCARA arm 40 sweeps over the mushroom bed, taking a series of images of the entire surface of mushroom bed. The images are stored in a memory associated with the robot's control system, and a processor along with image processing software "stitches" the series of images together to create a composition image or map of the entire surface of the mushroom bed. The stitching of images refers to the synthesis of a single image from a plurality of separate images gathered by the cameras and sensors. Images of the mushrooms taken by illuminating the mushroom bed with light of different wavelengths, provided for example by the multispectral lighting array 47, may be used for automated identification purposes in surveying the surface of the mushroom bed, assessing the growth stage and condition of the mushrooms growing in the bed, as well as distinguishing between compost, disease or salt clumps in the bed and the mushrooms to be harvested. Various methods are used to process the images taken by the camera 45 to identify the mushrooms to be harvested and to control the SCARA arm 40 and the end effector 54 for efficiently harvesting mushrooms of a given grade, for example, or for performing different types of picking operations at different stages of mushroom growth, as will be further explained below. Providing the camera 45 and lighting array 47 on the underside 48*b* of the forearm 48 enables real-time control of the end effector 50 during the harvesting operation when several mushrooms will be picked. Furthermore, in some embodiments, the scanning operation performed by the SCARA arm using the camera 45 and lighting array 47 may be performed simultaneously during the picking operations, whereby the scanning and picking operations are performed simultaneously, advantageously reducing the downtime that occurs when scanning and picking operations are performed sequentially. Additionally, mounting the camera 45 and lighting array 47 to the SCARA arm 40 enables verification of the mushroom orientation on the cup, so as to determine the optimum loading orientation into the fingers on the elevator for transporting the harvested mushroom to a box or package for further handling.

It will be appreciated by person skilled in the art that the camera 45 and lighting array 47 do not need to be mounted to the SCARA arm; for example, a camera 145 and lighting array 147 may be provided on a separate carriage or mount, for separately scanning the bed prior to or after harvesting. For example, in an embodiment illustrated in FIG. 23, a separate carriage or mount 140*a* may be affixed to a rack R1 above a travelling mushroom bed 142, travelling in direction X1, for scanning the mushroom bed 142 as it is conveyed past the camera and lighting array 145, 147, or it may be a mobilized carriage or mount that is adapted to travel above, so as to scan, the mushroom bed. In some embodiments, such as illustrated in FIG. 23, there may be first and second mounts 140*a*, 140*b*, wherein the vision system 145, 147 at the first mount 140*a* scans the travelling mushroom bed 142 prior to reaching the harvesting area 144, where the SCARA arm may be positioned for harvesting mushrooms as the travelling mushroom bed 142 passes through the harvesting area 144. The data captured by the vision system 145, 147 at the first mount may thereby be used to determine which mushrooms should be harvested by the SCARA arms as the bed 142 travels through harvesting area 144. Then, at the second mount 140*b*, a second vision system 145, 147 scans the travelling mushroom bed 142 after the harvesting operation has been performed, and such data captured by the second vision system may be used to validate the data captured by the first vision system at the first mount 140*a*. Optionally, having first and second vision systems mounted at the first and second mounts 140*a*, 140*b* may enable bidirectional travel of the travelling bed 142, wherein the bed 142 travels in both the direction X1 and in the opposite direction, so that regardless of which direction the bed 142 is travelling, the vision system at either mount 140*a* or 140*b* may scan the bed 142 as it travels past the mount 140*a*, 140*b*.

In some embodiments having the vision system, including the camera 45 and lighting array 47, mounted to the SCARA arm 40, the vision system may be configured to obtain a plurality of overlapping images to produce non-occluded views of the mushrooms. The vision system is programmed to obtain images of the mushroom bed from at least four positions, spaced apart from one another, with the position and speed of the SCARA arm 40 being monitored by a control system of the mushroom harvesting robot 1 during the scanning operations. The resulting four images, taken from the four different positions of the SCARA arm, partially overlap the adjacent images taken from the adjacent positions of the four positions of the SCARA arm. Different wavelengths of light, projected onto the mushroom bed from the lighting array 47 when the lighting array 47 is in a first position, are reflected from the surface topography of the mushroom bed and then captured by the camera 45. A processor of the control system analyses the light reflected from the surface of the mushroom bed, as captured by the camera 45 at the second, overlapping position of the SCARA arm 40 and the distance travelled by the SCARA arm as it moves from the first position to the second position, and by repeating this process while moving between the plurality of positions, the resulting map of the mushroom bed may provide detailed information about the bed's topography, including but not limited to information regarding the condition of the veil underneath the mushroom cap. Information about the condition of the veil underneath the mushroom cap is important for obtaining high grade mushrooms, as once the veil (which encloses the edges of the cap to the stem of the mushroom) is broken, the value of the mushroom is reduced. Although four overlapping positions of the SCARA arm, producing four overlapping images, is described above in an illustrative example, it is appreciated that more or less than four positions may be used in the imaging method described above.

In some embodiments, information regarding the condition of the veil underneath the mushroom cap may be obtained, for example, by analysing the light that is reflected by the surface of the mushroom bed and the light that is absorbed into the surface of the mushroom bed, as different wavelengths will be either reflected, absorbed or scattered by the different structures across the surface of the mushroom bed, which different structures include but are not limited to the mushrooms, compost, disease and salt piles. In accordance with the present disclosure, mushroom maturity may be estimated from images captured of the topography of the mushroom bed, by measuring the mushroom cap's normal gradient near the center and around the circumference. Generally, the radius of curvature of the button mushroom cap at its circumference and at the center of the cap both become larger as the mushroom approaches maturity and the veil is about to open, independent of the mushroom cap's diameter.

End Effector

As best viewed in FIGS. 9 and 10, the end effector includes a cup 56 and a neck 52, the neck having a helical reinforcing element 54, which allows the cup 56 to easily adapt to angled surfaces of targeted mushrooms to be harvested. Since mushrooms do not always grow vertically, and often grow at an angle to the vertical, the cup of the end effector is made of a soft, flexible material, such as a silicon rubber having a low shore durometer value and a high elasticity, so as to facilitate the cup passively conforming to the surface of a tilted mushroom cap as the cup is brought into contact with the mushroom. The material of the cup 56 may also taper towards the lip 56*a* of the cup, as shown in FIG. 9, so as to provide further softness and flexibility to the lip of the cup to facilitate conforming to the surface of the mushroom cap and reduce damage that may be caused to the mushroom when the lip contacts the mushroom. The neck 52 of the end effector is made of a resilient material, such as a silicon rubber having a higher shore durometer value and lower elasticity, as compared to the cup. The resilient property of the neck material also enables the neck to compress on one side of the neck, thereby also facilitating conforming the cup of the end effector to the surface of a tilted mushroom cap. Additionally, the combination of the resilient material and the helical reinforcing element of the neck allows the neck and cup of the end effector to snap back into its original orientation after successfully picking a mushroom. Advantageously, these combined features of the end effector enable a high amount of torque to be transferred to the mushroom without overly winding up the cup or collapsing the internal cavity of the cup or neck. As compared to a traditional bellow-style of suction cup, which creates additional pulling or moment forces on the cap of the mushroom, these pulling or moment forces on the mushroom are minimized by the end effector design described above, thereby reducing bruising or decapitation of the mushrooms during picking operations.

In some embodiments, the helical reinforcing element 54 may include a helical ridge integrally formed on the external surfaces of the neck. In other embodiments, the helical reinforcing element may include a metallic wire or spring adhered to the neck or incorporated into the material of the neck. The helical reinforcing element provides rigidity to the neck when a twisting motion is applied to the end effector in a yaw direction J to twist the mushroom cap approximately along an axis K passing through the stem of the mushroom, so as to transfer the torque to the mushroom without collapsing the neck or cup. However, the neck remains deformable in the pitch and roll directions, enabling the neck of the end effector to conform to the mushroom cap surface of a tilted mushroom.

In some embodiments, the cup may be formed of a silicon rubber and uses a graded durometry or a graded modulus of elasticity to reduce damage to mushroom tissue while remaining rigid. The graded modulus of elasticity allows the skirt to adapt to uneven surfaces and create a strong seal without collapsing or folding the skirt with higher vacuum forces, as a vacuum line applies a gentle negative pressure to the mushroom cap when a seal or partial seal has formed between the cup and the mushroom cap surface. The softest grade of silicon rubber 57, having a relatively lower durometer value and lower modulus of elasticity, is applied on the inner surface 56*b* of the cup, thereby preventing or reducing a vacuum ring from pinching in on the mushroom cap and creating rings or otherwise bruising the mushroom, while the stiffer grade of silicon rubber 58 is applied to the outer surface 56*c* of the cup and the neck 52. An example of ranges of shore durometer values, which are used by the Applicant as an approximation of the modulus of elasticity of those materials when selecting rubber materials for manufacturing the end effector cup and neck, without intending to be limiting, are as follows: in the cup, a range of 5 to 20; in the neck, a range of 30 to 50; in the helical ridge, a range of 30 to 50.

The interface layer 59 between the different grades of rubber is designed to maximize surface area of contact between the two layers to ensure a strong bond between different grades of silicon rubber used in the manufacture of the end effector. Furthermore, the interface layer 59 creates a gradual elasticity gradient, from the lip 56*a* of the cup towards the neck 52, which avoids a step change in elasticity through the body of the cup 56. Furthermore, the different grades of silicon rubber may be blended or mixed along the interface layer 59, during manufacture of the cup 56, so as to further enhance the elasticity gradient of the resulting cup.

The end effector may additionally include an internally integrated filter 53 to prevent particles from entering the vacuum line and fouling the vacuum line or vacuum source. The vacuum line inlet 55 is located at the mounting end of the cup. For example, the filter may be a metallic screen filter, or any other filter material known to a person skilled in the art.

End Effector Damping

The flexibility of the end effector in pitch and roll directions can result in significant movement of the mushroom on the end effector during rapid acceleration and deceleration as the mushroom is transported to the trimming elevator (for example, an approximate speed of 4 to 6 m/s and approximate maximum acceleration/deceleration of 10 to 12 m/s$^2$ to facilitate a harvesting rate of approximately 20 to 30 mushrooms per minute). The oscillating movement of the mushroom on approach to the fingers on the elevator for receiving the mushroom may present challenges to transferring the mushroom onto the elevator fingers. Ideally, the mushroom should be relatively stable to permit better loading of the mushroom onto the elevator fingers. In some embodiments, the oscillation of the mushroom may be dampened by incorporating an anti-rebound material capable of absorbing the energy of the oscillating end effector and mushroom into the neck 52 of the end effector, thereby damping the oscillating motion of the end effector and mushroom. An example of such a material, not intending to be limiting, includes a polymeric material sold under the trademark Nozorb™ by Northern Plastics, having a Bayshore Rebound value of 3%.

In other embodiments, such as the end effector 150 illustrated in FIGS. 20-22, the neck 152 of the cup 156 is made more rigid during high acceleration and deceleration motions by a balloon skirt 160 that snugly surrounds the spiral neck 152 of the end effector 150. The balloon skirt 160 is cast of silicon rubber and may have a thicker outer wall 160*a*, distal from the outer surface 156*c* of the cup 156, and a thinner inner wall 160*b*, adjacent the outer surface 156*c* of the cup 156 and the spiral neck 152, the inner and outer walls 160*a*, 160*b* defining a balloon cavity 160*c* therebetween. When the balloon cavity 160*c* is pressurized, the balloon skirt 160 constrains movement of the spiral neck 152, thereby stabilizing the mushroom being carried by the cup 156 as the mushroom is transported to the trimming elevator. The silicone balloon skirt 160 may be molded as a single piece and clamped into place between the internal ring 162 and suction cup mount 151. The profile of the internal ring 162 may be angled to allow the cup to articulate and to provide room for the balloon air fitting 164. For example, not intending to be limiting, the inner wall 160*b* of the balloon skirt may be 1 mm thick to stabilize the cup, and the outer wall 160*a* of the balloon skirt may be 2 mm thick so that the outer wall 160*a* does not become deformed under pressure and is more durable.

Tool Change Station

Figure 11:
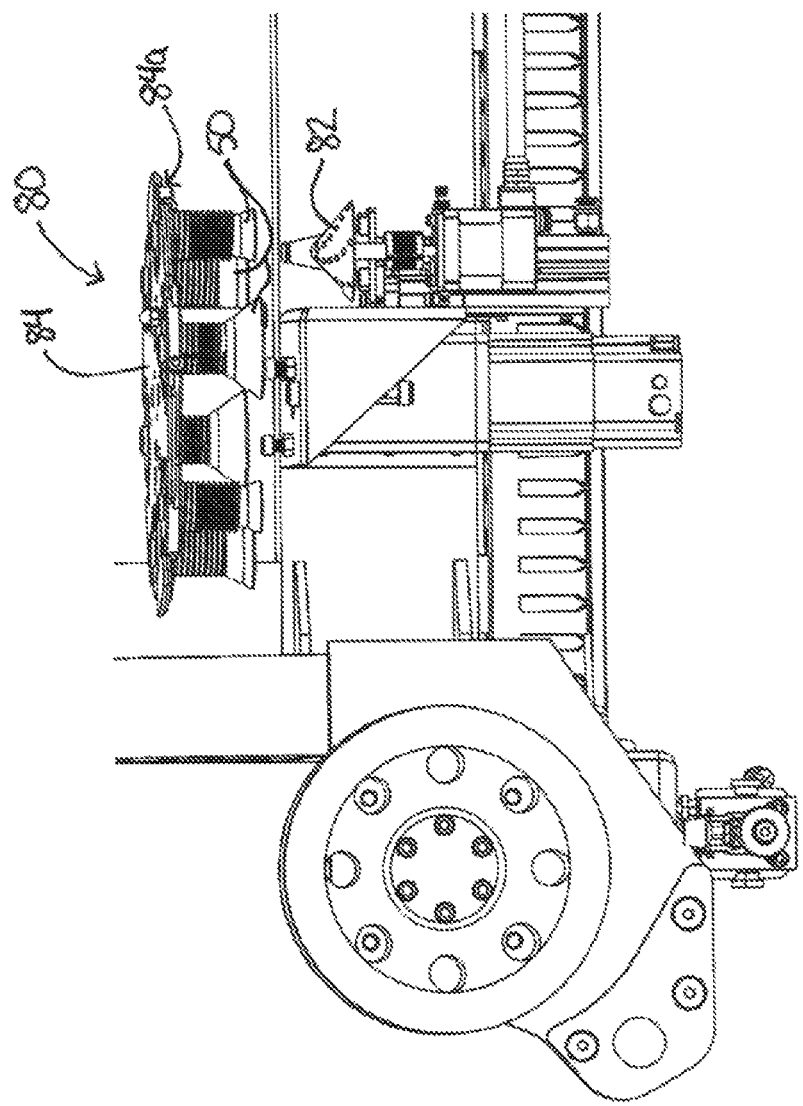
FIG. 11 is a close-up perspective view of a portion of the mushroom harvesting robot of FIG. 1, showing details of the tool changing and cleaning station.
Figure 12:
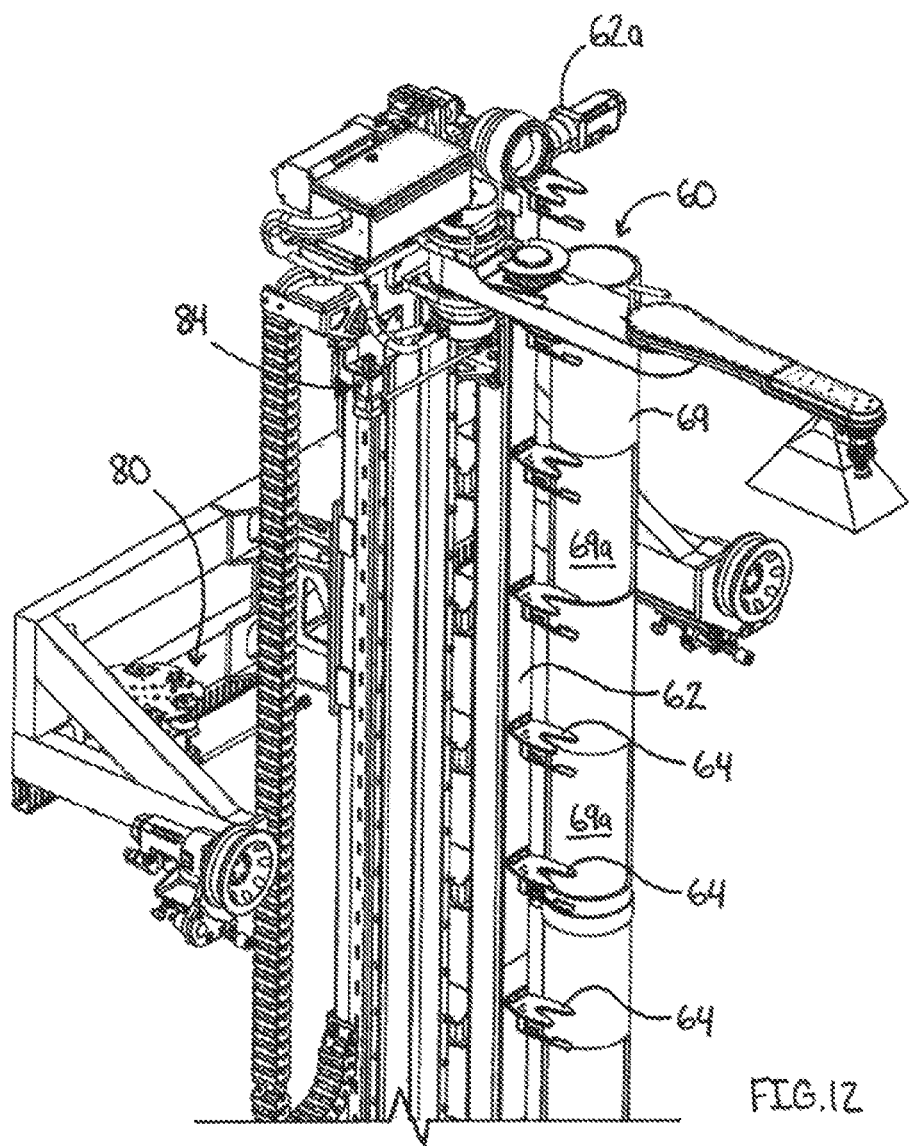
FIG. 12 is a close-up perspective view of an upper portion of the mushroom harvesting robot of FIG. 1, showing details of the elevator.
Figure 13:
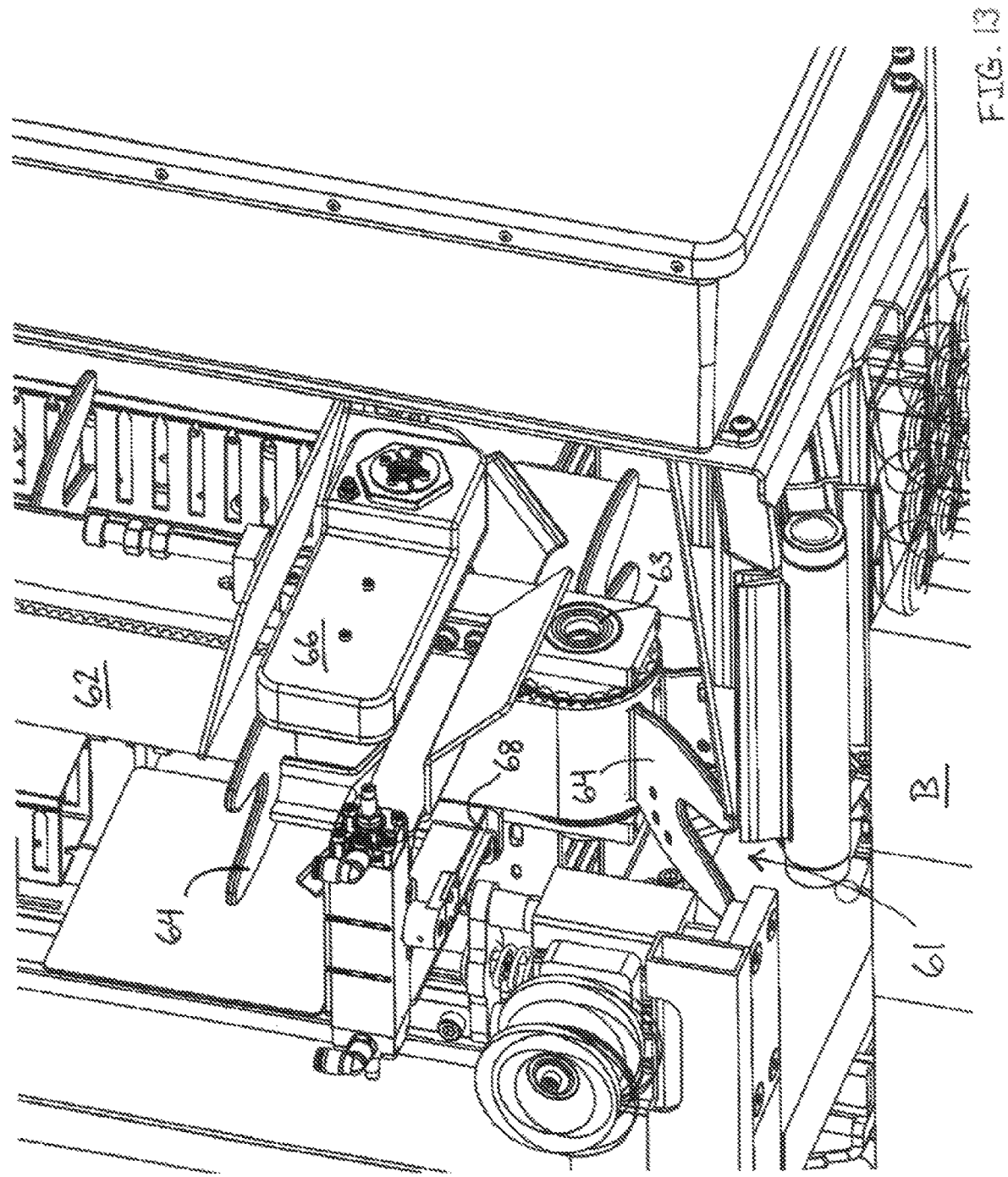
FIG. 13 is a close-up perspective view of a lower portion of the mushroom harvesting robot of FIG. 1, showing details of the elevator and cutting knife.
Figure 14:
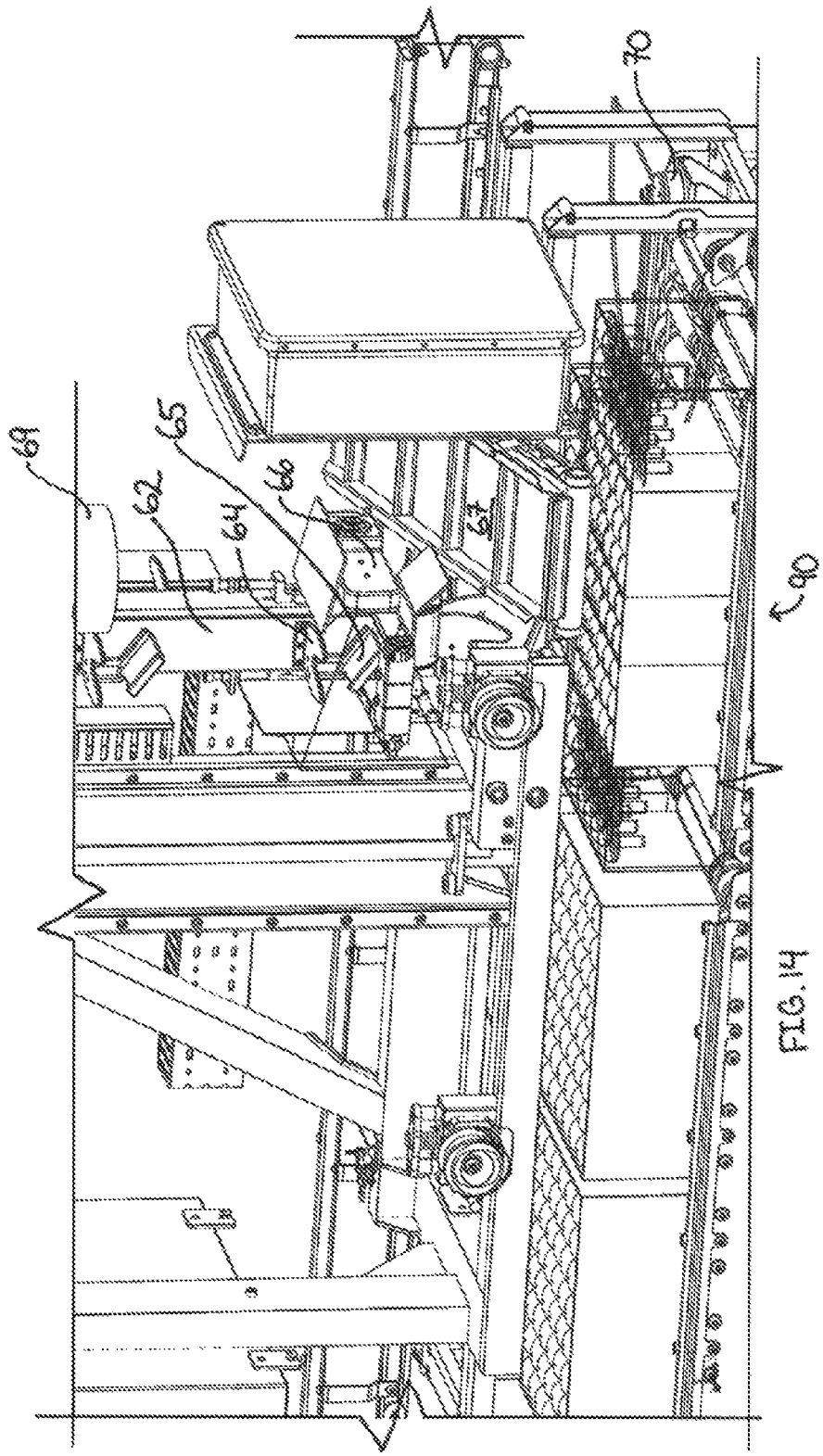
FIG. 14 is a close-up perspective view of a lower portion of the mushroom harvesting robot of FIG. 1, showing details of the box filling system.

In some embodiments, as best viewed in FIGS. 8 and 11, a tool change station 80 provides a plurality of end effector tools 50 for the SCAR, arm 40 to exchange for the purpose of changing the size and type of tool optimized for a particular mushroom size to be harvested, and to exchange fouled tools for clean tools. The tool change station 80 may also include a tool cleaning nozzle 82 for removing accumulation of debris from the end effector tools stored on the tool change station. The nozzle 82 may have a cone-shaped geometry and is designed to receive the cup 56 of the end effector 50, so as to direct a pressurized stream of water, air or cleaning solution on the inner surface 56*b* of the cup 56 to remove any debris from the inner surface of the cup. In some embodiments, the tool change station 80 includes a servo motor driven rotary platform 84 with a plurality of slots 84*a* for supporting the plurality of tools. The plurality of end effector tools 50 may include end effectors 50 of different sizes or configurations suitable for the harvesting of different sizes and/or types of mushrooms. Alternatively or additionally, the system may include a tool cleaning station 84 mounted to the vertical platform, wherein the end effector 50 mounted to the SCARA arm 40 may be cleaned every time the robot moves along the rack in a horizontal direction.

Elevator Conveyor and Trimming

In some embodiments, as best viewed in FIGS. 1, 3 and 12-15, the automated mushroom harvesting system includes an elevator 60 for transferring the harvested mushrooms from the end effector operated by the SCARA arm to a knife for trimming the mushroom, and then depositing the harvested mushroom into a container for shipment. The elevator conveyor 60 comprises a driven vertical conveyor 62 positioned adjacent the vertical carriage assembly 30, the elevator conveyor 60 having a plurality of finger assemblies 64 spaced along the vertical conveyor 62 for receiving mushrooms picked by the SCARA arm end effector and transporting the picked mushrooms to a box filling and handling system 90 located at the bottom of the robot assembly. The vertical conveyor 62 may be driven by a servo motor 62*a*.

In some embodiments, a second multi-spectral 3D vision system 66 is located below the picking elevation of the bottom growing shelf and positioned to inspect the mushrooms on the elevator as they travel down. The images obtained from the second multi-spectral 3D vision system 66 may be used to determine the cap diameter, stem length, soil debris on the stem, and the condition of the mushroom veil. This information may then used to position the elevator finger assemblies 64 so as to position the harvested mushroom adjacent to a trimming knife 68 which is actuated to remove the soil and stump from the mushroom at the desired location, based on product parameters defined by the user. Configurable options for trimming may include, for example: no trimming, trim to fixed length, trim to length relative to the diameter of the mushroom cap, or minimized trim to remove the soil and stump from the stem, or combinations of these options.

The veil condition as detected by the multi-spectral 3D vision system 66 may be used in grading decisions or quality control metrics as selected by the operator, as well as monitoring the growing conditions of the mushroom bed where the mushroom was picked from. Furthermore, in some embodiments the images captured by the second vision system 66 may be used as feedback to improve the accuracy of identifying mushrooms ready for harvesting, as determined by data collected by the first multi-spectral 3D vision system 45, 47. The first vision system 45, 47, typically located on the SCAR, arm and used to scan the mushroom beds during or prior to a harvesting operation, predicts the maturity and ripeness of a mushroom based on an estimation of the changing gradient of the mushroom's upper surface, as further explained below. However, the first vision system 45, 47 can only capture images of the upper surface of the mushroom cap, and typically does not capture images of the mushroom's veil underneath the mushroom cap. However, because the second vision system 66 captures images of the harvested mushroom when the mushroom is loaded onto the vertical conveyor 62, the underside of the mushroom, including the mushroom veil, is included in these images. Therefore, the image data captured by the second vision system 66 may be used to validate the data captured by the first vision system 45, 47, and may be used to improve the algorithms and methods that the system uses to process and interpret the image data captured by the first vision system so as to identify the mushrooms that are ready to be harvested. In some embodiments, the system may therefore improve the accuracy of identifying which mushrooms are ready for harvesting.

Upon trimming, a deflector 65 below each elevator finger assembly 64 deflects the waste towards the waste chute 69 and waste conveyor 67 and away from the finished product M. The finger and deflector assembly 64, 65 may be mounted to the vertical conveyor 62 using a dovetail mount with embedded magnet(s), permitting ease of replacement of the finger and deflector assembly 64, 65 without tools while maintaining the functional integrity of the finger assembly 64 during operation and transport. The elevator finger assemblies 64 may be geometrically optimized to provide stable presentation of the mushroom to the trimming vision system and as the mushroom is being trimmed by the trimming knife 68. The elevator finger assemblies 64 are substantially planer with a V-shaped opening to accommodate mushrooms (cap and stem) of various sizes, and is slightly dished like a bowl to help locate slightly misaligned mushrooms on the finger assembly, and so as to increase the likelihood of a stemless mushroom being retained on the finger assembly as it travels to the drop point 61 of the elevator conveyor 60.

As the finger assembly 64 carrying the trimmed mushroom descends down the vertical conveyor 62, it reaches the tail shaft 63 of the conveyor 62 and then proceeds to rotate from a horizontal position to a vertical position and then to an inverted position as it travels around the tail shaft 63. The mushroom dislodges from the fingers under the influence of gravity at drop point 61 and drops into the box B below. In some embodiments, optionally an actuated assembly may pick the mushroom from the finger assembly 64 with an end effector to controllably place each mushroom into a box B positioned below the drop point 61.

Adjacent to the elevator is an apertured waste chute 69 that receives waste product from the SCARA arm 40, the waste chute 69 having a plurality of apertures 69a at each shelf picking elevation. Alternatively, in some embodiments (not shown), rather than having a single waste chute 69 with a plurality of apertures 69a, there may be a plurality of individual waste chutes provided at each shelf picking elevation. The waste chute 69 directs the waste to the waste conveyor 67 which also collects the trim waste from the trim station and accumulates the waste until the robot is docked for unloading. A dedicated waste box is positioned at the docking station and the waste conveyor 67 on the robot advances the waste into the waste box while the full product boxes B are discharged from the robot and empty product boxes are brought onto the robot box handling system.

Conveyance and Handling

Figure 15:
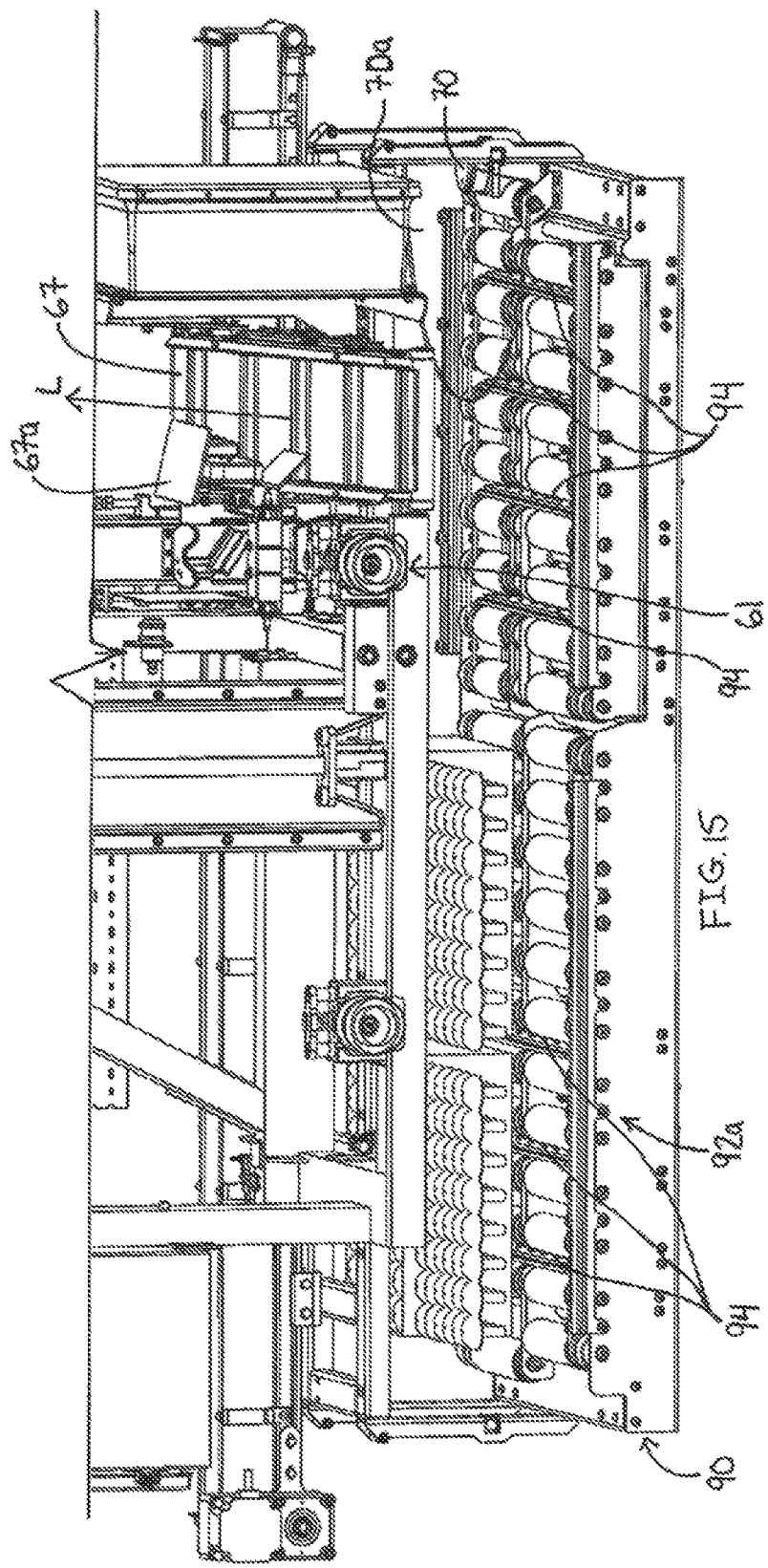
FIG. 15 is a close-up perspective view of a lower portion of the mushroom harvesting robot of FIG. 1, showing details of the box filling system.

As best viewed in FIG. 15, the box conveyance and handling system 90 at the bottom of the robot assembly 1 consists of two arrays of rollers 92a, 92b, the rollers arranged so as to be axially perpendicular to the side of the growing rack R, with each array 92a, 92b split to be independently driven. Jump belt conveyors 94 cross the two roll conveyors for transferring boxes from one roller array to the other in either direction. The box handling system 90 can accommodate multiple open top boxes or trays B (for example, five boxes or trays) with the ability to position one box accurately below the elevator drop point 61 using a 3D or proximity sensor, such as lidar 70, having a sweep plane 70a, to locate the box and control its position through combined actuation of the arrays of rollers and jump belt conveyor below the loading J drop point 61, When a mushroom falls out of the finger assembly 64, it falls into a box B at drop point 61 (the box removed from FIG. 15 for clarity). The roll conveyor section 92b immediately below the loading/drop point 61 may be supported on load cells (not shown) used to measure the weight of the box and its contents, thereby providing feedback to the control system to control the weight of mushrooms placed in each box loaded. Deflectors 65, positioned proximate to and beneath the fingers 64, are for redirecting falling debris into the waste chute 69 to prevent debris from falling into the boxes B and contaminating the mushrooms packed into boxes B.

Figure 16:
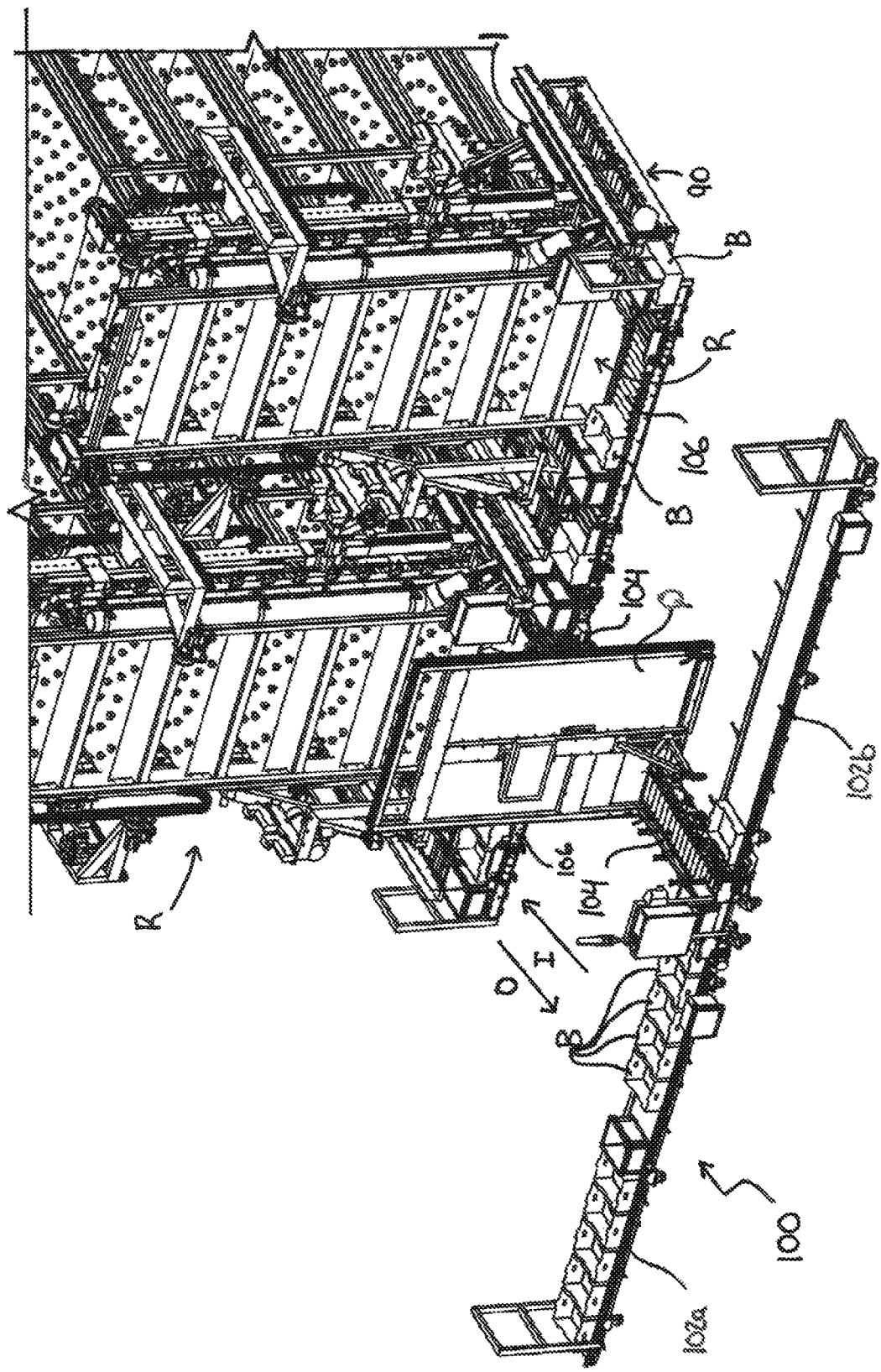
FIG. 16 is a perspective view of an embodiment of the box conveyor handling system in accordance with the present disclosure.

The open top box or trays can have packaging such as punnets, tills, bags, or smaller trays arrayed within so that the smaller packages can be filled by weight directly as the mushrooms are dropped or placed from the elevator 60. The box conveyance and handling system 90 is charged with open top boxes, trays, and the like. In some embodiments, the box conveyance and handling system 90 at the bottom of the robot assembly may dock with a room conveyance and handling system 100, such as the system 100 illustrated in FIG. 16. As shown in FIG. 16, an illustrative example of a room conveyance and handling system 100 may include at least two conveyor beds 102a, 102b, located outside an entrance Q to the growing room, where a plurality of mushroom growing racks R are located (the walls surrounding the entrance Q to the growing room are removed from FIG. 16 for clarity). Conveyor bed 102a may convey empty boxes B into the grow room, while conveyor bed 102b may convey boxes B filled with mushrooms out of the grow room, for transporting the filled mushroom boxes to a transport vehicle for taking the harvested mushrooms to warehouse and market. Conveyor beds 102a, 102b may be adjacent to a central conveyor bed 104, for carrying empty boxes into the grow room through entrance E, in direction I, and for carrying boxes filled with mushrooms out of the grow room through entrance E, in direction O. Central conveyor bed 104, inside the grow room, may also be positioned adjacent branch conveyor beds 106, the branch conveyor beds 106 positioned adjacent the box conveyance handling system 90 at the bottom of each robot assembly 1 inside the grow room, the branch conveyor beds 106 positioned so as to supply empty boxes to the box conveyance handling system 90 and for moving boxes filled with mushrooms away from the robot assembly 1. It will be appreciated by a person skilled in the art that the configuration of a room conveyance and handling system 100 is not limited to the illustrative example shown in FIG. 16, and that other configurations of conveyor beds 102, 104 and 106, designed for particular configurations of grow rooms, are also intended to be included in the scope of the present disclosure. For example, there may be more or fewer conveyor beds 102, 104, 106 than are shown in FIG. 16, and such conveyor beds may be positioned in a variety of different configurations.

Figure 17:
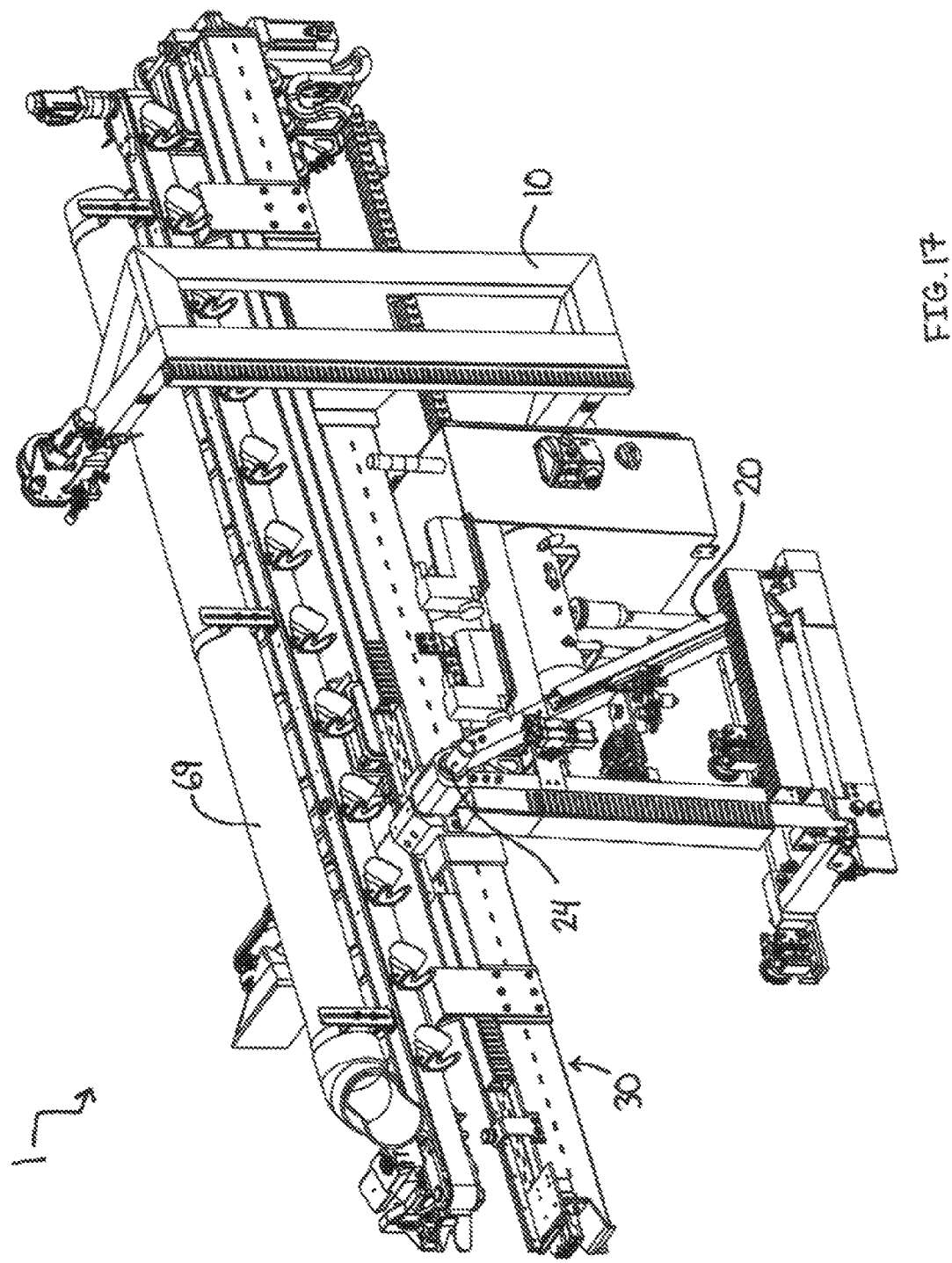
FIG. 17 is a perspective view of the mushroom harvesting robot of FIG. 1, illustrated in a folded configuration for transport.
Figure 18:
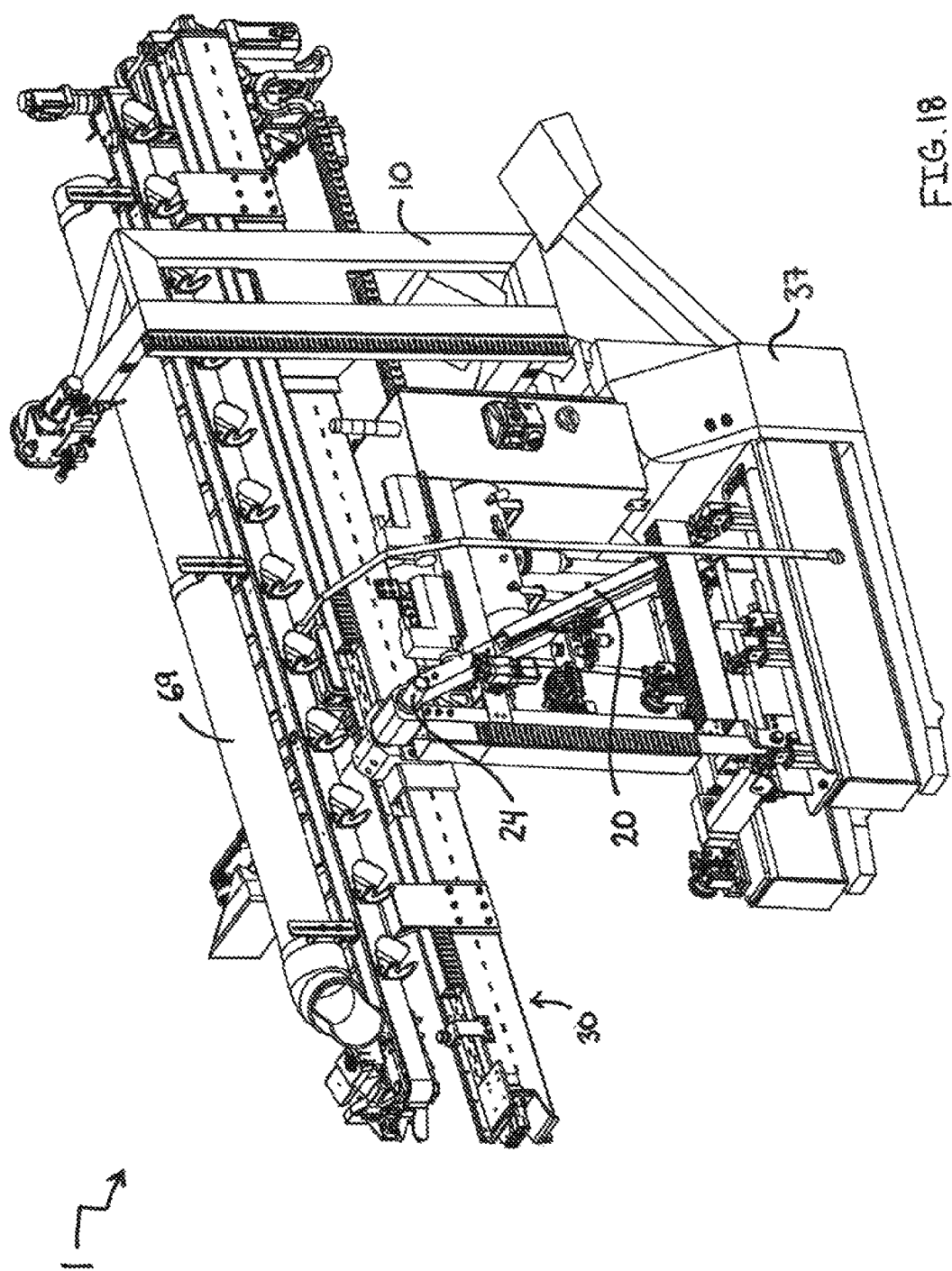
FIG. 18 is a perspective view of the folded mushroom harvesting robot of FIG. 17, loaded onto a transport platform.

Optionally, the box conveyance and handling system 90 may be detachable from the lower horizontal carriage assembly 20 and the vertical carriage assembly 30 of the mushroom harvesting robot to facilitate relocating the robot 1, by using a transport platform to lift the robot 1 off of one rack R, move it, and then place it onto another rack R. As shown for example in FIGS. 4, 17 and 18, the vertical carriage assembly 30 may be mounted to the lower horizontal carriage assembly chassis 20 by a pivot assembly 24, allowing the mast (which includes the vertical carriage assembly 30, elevator 60, waste chute 69, and the upper horizontal carriage assembly 10) to rotate in direction P, thereby reducing the overall height of the robot assembly to facilitate moving the robot from one location to another, such as through doorways and for shipping. When the robot assembly 1 is in a folded configuration, such as shown in FIGS. 17 and 18, it may be loaded onto a robot transport platform 37 for transporting the robot 1 from one rack to another, or for transporting the robot between mushroom grow rooms.

Operation

Preferably, once the robot is mounted on a growing or harvesting rack and powered up, it may automatically identify the rack that it is mounted to. Identification of the rack on which the robot 1 is mounted may be accomplished by a sensor, such as a camera, scanner or single point laser sensor 31, mounted on the vertical carriage assembly 30 adjacent to the SCARA arm 40, for identifying a OR code, a barcode or similar identification code on the frame of the rack R, as best viewed in FIGS. 4 and 7. Other identification mechanisms may include RFID tags, or other unique electromagnetic or optical identifiers as would be known to a person skilled in the art. Upon connecting to the mushroom growing room's control system and verifying room identification, the rack dimensions and configuration is received by the robot control system, by means of a database or a locally configured system.

In operation, the robot 1 then verifies the rack topology by travelling up and down the length of the rack R in direction X, with the vertical and horizontal carriage assemblies at various elevations. A single point distance sensor is mounted to the vertical stage and/or the vertical axis, at or just below the elevation of the upper horizontal carriage, and directed towards the growing rack frame, and a lidar or sweeping single point range sensor 43 is mounted on top of the SCARA arm. Both sensors are used to determine the rack topology and dimensions and to detect and avoid obstacles both during rack orientation and normal scanning and harvesting operations.

The operator may configure which product size and maturity range the robot is to harvest, along with the target package weights. The configuration may be demand based, order based, or schedule based. The mushroom grower may configure the thinning parameters for how aggressive the robot should be to create space for optimal growth and clear clusters, using the thinning methods described in more detail below.

Once configured and initialized the robot may proceed to scan the growing rack, section by section, following a path optimized for performance. During scanning operations, the SCARA arm 40 is positioned above the mushroom bed in each section of the rack while folded, and then extended to reach out over the bed. The arm 40 sweeps over the bed while the vision system 45 acquires 3D and multispectral imagery of the mushroom bed below. During the image acquisition the images obtained by the vision system 45 are stitched together to create a composite image, and processed to create an overall map of the bed. Once a section S1, S2, S3, etc. is imaged, the system determines what imaged objects are mushrooms, the size and maturity of those mushrooms, and then based on product grading rules proceeds to pick the qualified mushrooms, according to the methods described in greater detail below.

The physical picking process can be described as including four distinct modes, namely: thinning, harvesting, clearing, and disease mitigation.

Thinning is performed prior to harvesting to manage the bed growth and thereby minimize interference of mushrooms growing adjacent to one another, thereby resulting in higher yield and quality. Thinning may also performed during harvesting, and informs the decision regarding which mushroom to pick as the bed becomes more dense or clustered, thereby leading to cluster detection and mitigation.

Harvesting is generally based on the size of the mushroom, where a particular cap diameter range is selected for a given product and then harvested. In addition, mushroom maturity may inform the harvesting decision to pick a mushroom prior to its veil opening, which may result in picking a mushroom of a smaller size (or in other words, of a size that is smaller than the selected size range) to avoid quality degradation of the mushroom by harvesting the maturing mushroom too late. The harvesting methods described herein may thereby maximize the mass of the mushrooms that are harvested and sold in market, by selecting mushrooms for harvesting based on the maturity of the mushroom, as well as the size of the mushroom. Mushroom maturity can be estimated by measuring cap normal gradient near the center and around the circumference. Generally the radius of curvature of the button mushroom cap at its circumference and at the center of the cap both become larger as the mushroom approaches maturity and the opening of the veil independent of cap diameter, as described in further detail below.

Clearing is performed to prepare the bed for the next flush in which all mushrooms, regardless of size and maturity, are removed. This process may include particular methods for detecting and picking up fallen debris or fallen/sideways mushrooms, and depositing them into the waste chute. Furthermore, those mushrooms determined to meet the grade required for sale in the market may be selected and packed for market during the clearing operation.

Picking

The picking decision process may use heuristic picking rules, artificial intelligence, or a combination of the two. After segmenting and classifying the image, the resulting identified mushrooms are measured for cap center point, elevation, cap diameter, cap normal, cap circumference gradient, stem angle estimation, colour and texture. These parameters, along with their temporal variants collected during previous scanning operations, are used to determine which mushrooms to pick in each pass, as will be further explained below.

Picking techniques include combinations of the following actions alone or in ordered sequence combination: push, pull, twist, tilt. Depending on mushroom size, maturity and locality relative to other mushrooms of similar and different elevations, different sequences of actions may be appropriate to pick a targeted mushroom. For example, a mushroom in the middle of a cluster, with no clear space around it, may only be twisted and pulled, whereas a mushroom with some clear space adjacent to it may be tilted, twisted and pulled, or simply tilted and pulled. The mushroom neighbour density, mushroom maturity, and other factors may make the mushroom more susceptible to damage such as by decapitation, which therefore informs the sequence of picking actions for a targeted mushroom in order to reduce the damage that might otherwise occur to the mushroom during picking.

Tilt picking generally reduces the probability of decapitation damage, and requires clear space adjacent the targeted mushroom to tilt the mushroom into. In one aspect of the present disclosure, the system may identify whether there is clear space around the targeted mushroom, and the estimated mushroom stem angle relative to the growing bed surface, to determine the best direction and radius of tilt to perform while picking the mushroom. In this way the mushroom is tilted into the best clear space available, considering the stem angle, nearby neighbours, estimated stem length, and nearby soil clump interferences. When a cluster is detected, in some embodiments one method of reducing the cluster is to pick the peripheral mushrooms in the cluster by tilting into clear space away from the cluster center or by using a combination of picking actions, gradually reducing the cluster starting from the periphery and moving inwardly towards the center of the cluster.

Cluster Detection Algorithm

For each mushroom, all other nearby mushrooms whose outer mushroom perimeter is within a specified proximity are identified and evaluated. If the targeted mushroom and the compared mushroom are significantly different in size, then it is assumed that the larger of the mushrooms will be removed in time for the small one to grow up, meaning the proximate mushrooms will not grow into each other. Likewise, if the targeted mushroom and the proximate mushroom are at significantly different heights relative to the surface of the mushroom bed, they are considered to not grow into each other in the future as each mushroom is likely on a different layer (or strata) of growth than the other. If all the above criteria are fulfilled, then the targeted mushroom is added to a neighbour list.

If there are at least three other mushrooms (in other words, four or greater mushrooms that are within the specified proximity to one another) in the neighbour list for a specific mushroom, then the beginnings of a cluster has been identified, Once all of the clusters have been identified, any clusters that have overlapping members are classified into a single, larger cluster.

For picking in a cluster, the centre of mass of each cluster is detected by weighting the average location of the cluster from each mushroom according to its diameter. The cluster is then picked from the outside in, starting from the mushroom the farthest away from the centre of mass of the cluster. Only the mushrooms that are within an additional tolerance of the set minimum grading diameter are picked and once the final mushroom within the grading tolerance is picked the remainder of the mushrooms in the cluster which were below the size tolerance are left to continue growing.

Thinning Logic

During any phase of the growth cycle but typically more often on the first few days of the flush, during which time the mushroom pins are forming and beginning to grow, the point at which the pins have diameters of approximately 20 mm or larger, the mushroom growth densities and clustering behaviours may be identified and dealt with early on. Thinning algorithms involve optimising spacing between neighbouring mushrooms and maximizing the growth opportunities for as many mushrooms as possible, while reducing clumping, clustering, deformation of caps due to close proximity to other mushrooms, and other negative effects of clustering such as $CO_2$ build-up and accelerated maturation that may be induced by such micro-climates. One method of examining future potential interference of small mushrooms is to analyse their growth rates or using a generic growth model, and then projecting forward in time to estimate the diameters and locations of each mushroom when they will become harvestable, as well as potential effects on nearby mushrooms. Based on the projected sizes of all mushrooms detected, the potential interferences can be heuristically or AI-optimised to select small mushrooms for pre-emptive destructive removal with a smaller, 'thinning' end effector and picking motions used for thinning. The thinning process can be very aggressive early on, and then more selective/sparse thinning may occur later in the flush. Thinning rules for how aggressive the algorithm should be, for example the time-base for growth projection and limits for maximum harvest effort in a single pass, are dictated by user adjustable parameters and may also be driven by AI optimisation to seek maximum yield.

Shared stems and tightly clustered mushrooms will decapitate more easily, and also brown or degrade faster, along with clumping and attached mushrooms while picking another mushroom causing the attached secondary mushroom to be lost product. The thinning algorithm can be used to pre-emptively target clumping pins with shared stem systems for destructive removal, which plays a role in improving the quality of the nearby growth, thereby producing better yields when picking later on in the flush.

Filtering and Segmentation

Multispectral imaging approaches to mushroom segmentation is used to identify and separate the mushroom flesh from the soil and mycelium root masses surrounding the mushrooms. A camera with a multispectral suite of sensors to capture 3D depth images, Infrared images (IR), and standard colour images is used along with multispectral external lighting controlled by the robotic system, all of which may be configured based on the detection tasks being performed. For example, the external light source may include the following: white LEDs with 6000K colour temperature, red LED (635 nm), green LED (515 nm), blue LED (465 nm), ultraviolet (UV) LED (365 nm), and infrared (IR) LED (850 nm).

During normal mushroom detection tasks, the dominant wavelength is from the white light source, and the area is also illuminated with the IR light source to support depth and IR imagery. To detect mushrooms, it is important to remove (or segment) data which may lead to false positives or influence accuracy while retaining the best possible quality of data which represents a valid mushroom.

The IR images are thresholded by intensity to segment soil (dark) from mushrooms (light). The colour images are used to further segment mushrooms from other data, such as soil or non-mushroom-like objects, using saturation and value combinational thresholding, for example in the HSV colour space.

Mycelium root masses are segmented by colour images examining high frequency variations of the saturation or value colour spaces in the image using a convolutional kernel filter. By identifying and segmenting these root masses out of the 3D images it can reduce false positive detection in the mushroom identification process.

Mushroom farmers use salt to treat disease on the mushroom beds, and piles of white salt may cause false positives or other negative influences on the detection processes. Therefore, preferably salt clumps may also be segmented from the colour images. Standard white salt segmentation is achieved by examining the colour images and segmenting by the salt pile's characteristic combination of saturation and value properties, in addition to further logical checks for pile size and shape irregularities. Other optical and external lighting methods can be used to assist with segmentation of salt piles, including using a combination of coloured LEDs to highlight the salt pile more effectively and help differentiate between white salt and white mushroom flesh. Additional steps, such as adding blue or other colour food dyes to the salt and segmenting by hue in the colour images, are alternative or additional embodiments for segmentation of salt piles.

White and brown mushroom varieties have different optical characteristics and require their own unique set of segmentation parameters to effectively identify them in the images while ensuring high quality data remains. White mushrooms have a uniquely low saturation response to visible light, while having a high intensity response, whereas brown mushrooms have a higher saturation value, yet lower intensity response. Brown mushrooms may require additional hue-based segmentation to assist with soil segmentation, as they can sometimes appear close to soil in terms of saturation response. This is due to the type of casing used on the top layer by the farmers, which range from a very dark Irish peat to a lighter Canadian blond peat.

Disease Detection

In some embodiments, the system may perform a specific scanning operation to identify disease, which may include multiple passes over an area with different combinations of external lighting enabled and/or with varying light intensities. Using such lighting and scanning techniques may enable highlighting different strains of mold and disease on the mushroom casing/soil and mushrooms themselves during scanning operations. For example, using UV light as the primary light source may cause certain fungus and diseases to fluoresce green in a colour image. In other examples, using different combinations of white, red, green, blue, and UV lighting, various brown and green molds may be highlighted and detected. Artificial intelligence or machine learning (AI) classification of known (trained) common diseases using colour images and the abovementioned special external lighting assistance may also be employed for the automated detection of different diseases. Patches of discolouration can be identified by supplying a library of images of healthy soil, enabling the artificial intelligence classification system to learn the general characteristics of healthy soil, casing, compost and mycelium, then checking for areas in a mushroom bed map which are deviating from those learned characteristics. Operators of the robotic mushroom harvesting system may then be alerted to the location, size, and type of disease identified. Disease scanning may be initiated by an operator, or may be performed regularly as part of the autonomous behaviours of the system. Online/background disease monitoring for common and easily visible diseases using regular colour or multi-spectral images collected during standard mushroom harvest scanning may be achieved with AI classifier systems efficiently, once trained.

Tilt-Pick Vector

The mushroom Tilt-Pick Vector is defined as the radial direction vector on the horizontal plane in which the mushroom will be manipulated during picking. The Tilt-Pick Vector is determined by, firstly, isolating a region of interest on the depth image within a specified radial search distance from the center of the mushroom. Nearby mushrooms and soil are removed from the image if their vertical position is outside a threshold depth distance from the targeted mushroom's center-point height. Nearby mushrooms that are earlier in the picking order than the targeted mushroom are also removed from the mask image. A morphological opening is performed on the resulting masked image to eliminate noise and small objects. Rays projecting radially outward from the center of the mushroom are then evaluated using two factors: The Clear Space Score and the Tilt Vector Score (as defined below). The center of the ray with the highest combined score is the final Tilt-Pick Vector.

Clear Space Score

The Clear Space Score gives higher scores to rays pointing away from nearby mushrooms and soil obstructions. When picking clusters and dense mushroom beds, evaluation of the Clear Space Score prevents collisions with nearby mushrooms and prevents decapitations due to collisions with soil clumps. Each ray originating from the center of the mushroom of interest is assigned a score inversely proportional to the number of obstructions within the search distance. A ray full of obstructions receives a score of 0, and a ray with a number of obstructions below a threshold receives a maximum score. Rays with a maximum score receive a bonus proportional to their angular distance from the nearest obstruction, causing a ray situated radially between two obstructions to have the highest score for that arc segment between the two obstructions, Tilt Vector Score The Tilt Vector Score gives higher scores to rays along the axis orthogonal to the mushroom tilt direction, and lower scores to rays along the tilt direction axis. Evaluation of the Tilt Vector Score prevents decapitations due to high tensile and compressive forces imparted on the mushroom stalk when tilting along the tilt direction axis. Each ray originating from the center of the mushroom of interest is assigned a base score. Four Gaussian curves centered on the four cardinal directions aligned to the tilt direction provide additive or subtractive adjustments to each ray's base score. The two Gaussians aligned to the tilt direction axis subtract from the base score, and the two Gaussians aligned to the orthogonal axis add to the base score. The magnitude of these additive and subtractive curves are proportional to the magnitude of the mushroom's tilt.

A high Clear Space Score for a ray represents a low probability of the mushroom being pulled into an obstruction, and a high Tilt Vector Score for a ray represents a low probability of mushroom decapitation due to mushroom cap tilt. Once the highest scoring Tilt-Pick Vector is found, a rectangular projection of the mushroom's path along the tilt-pick direction is created from the depth mask for a final clearance check. If there are mushrooms that are earlier in the pick order than the mushroom of interest, and they intersect the projection mask, the mushroom with the largest area within the projection mask is assigned the mushroom of interest's Dependency ID. If the projection mask has below a threshold total obstructions within the rectangle, the Tilt-Pick Vector passes the clearance check, and the vector is returned. Otherwise the function returns an invalid vector meaning there is no safe vector in which that particular mushroom may be tilted in during picking.

Fallback Vector

A second Tilt Vector called the Fallback Vector is also calculated, except in calculating the Fallback Vector, no mushrooms that are earlier in the pick order than the mushroom of interest are removed from the mask image. If the mushroom with the mushroom of interest's Dependency ID failed to pick, the Fallback Vector is used as the Tilt-Pick Vector provided it passes the clearance check. This allows dynamic tilt motion adjustment dependent on the potential failure of a previously attempted mushroom which the current mushroom depended on for its own valid tilt-pick vector.

Mushroom Tilt Estimation

The Mushroom Tilt Estimation uses the previously calculated mushroom 3D normal vector array and the mushroom crest position to approximate the mushroom cap tilt direction and magnitude, and can estimate stem orientation using the mushroom cap's tilt orientation where they are opposing orientations. This algorithm is a weighted combination of the scaled average mushroom normal and cap shape elliptical eccentricity. As the mushroom tilts at a higher angle, the resulting image of the cap shape, as taken from above the mushroom bed, transitions from circular to an elliptical shape, and the direction and magnitude of the tilt can be calculated. Each of the weighted combinations are weighted based on their own estimates—the normal estimates are weighted higher when they estimate low tilt angles, and the ellipse estimate is weighted higher at higher estimated tilt angles. If the mushroom cap shape is too irregular, and the ellipse estimate has a low goodness of fit along the cap boundary, the ellipse tilt estimate is discounted.

As will be apparent to those skilled in the art in the light of the foregoing disclosure, many alterations and modifications are possible in the practice of this invention without departing from the spirit or scope thereof.

What is claimed is:

1. An automated mushroom harvesting system for mounting to a vertical mushroom rack, the system comprising:
   a first robot having a frame comprising upper and lower horizontal carriage assemblies and a vertical carriage assembly connected to the upper and lower horizontal carriage assemblies, wherein the first robot further includes an elevator, the elevator comprising:
      a vertical conveyor and a plurality of finger assemblies mounted to the vertical conveyor in a spaced-apart vertical array, each finger assembly of the plurality of finger assemblies configured to receive a harvested mushroom from the end effector,
      a trimming vision system located adjacent the vertical conveyor, the trimming vision system configured to image the harvested mushroom when supported in a finger assembly of the plurality of finger assemblies, and
      a trimming knife positioned adjacent the vertical conveyor for trimming the harvested mushroom when the harvested mushroom is supported in the finger assembly,
      wherein the trimming vision system is in communication with a control system of the first robot, and wherein images obtained from the trimming vision system are provided as inputs to the control system so as to control actuation of the trimming knife to trim a stem of the harvested mushroom; and
   a SCARA arm slidably mounted to the vertical carriage assembly by a vertical stage, the vertical stage operable to move the SCARA arm along a vertical mast of the vertical carriage assembly,
   the SCARA arm comprising a shoulder mounted to the vertical stage, an upper arm pivotally mounted to the shoulder at a first end of the upper arm and a forearm pivotally mounted to a second end of the upper arm at an elbow, the forearm having a free end distal from the elbow and a rotary motor mounted at the free end for releasably mounting and rotating an end effector,
   wherein, when the upper and lower horizontal carriage assemblies are mounted to outer horizontal rails of a vertical mushroom rack, the SCARA arm is movable between a first position located outside an outer edge of the mushroom rack and a second position above a mushroom bed supported within a volume defined by an outer edge of the mushroom rack.

2. The system of claim 1, wherein an arc of travel of the end effector from the first position to the second position is at least 180 degrees.

3. The system of claim 1, wherein an area of coverage of the end effector above the mushroom bed is equal to 70% of a total width of the mushroom bed.

4. The system of claim 3, further comprising a second robot, wherein the first robot is configured to be mounted to a first side of the mushroom rack and the second robot is configured to be mounted to a second side of the mushroom rack, opposite the first side of the mushroom rack in opposed facing relation to the first robot, and
   wherein a combined area of coverage of the end effector of each of the first and second robots is equal to or greater than 100% of the total area of the mushroom bed.

5. The system of claim 1, wherein the vertical mast of the vertical carriage assembly extends substantially along a height of the vertical mushroom rack, the vertical mushroom rack having a plurality of levels for supporting a plurality of mushroom beds, and wherein the vertical stage moves the SCARA arm along the vertical mast so as to position the SCARA arm above the plurality of mushroom beds located on each level of the plurality of levels of the mushroom rack.

6. The system of claim 1, wherein the upper and lower horizontal carriage assemblies include at least one driven wheel and at least one idler wheel, the at least one driven wheel driven by a motor for translating the first robot in a horizontal direction along the outer rails of the mushroom rack.

7. The system of claim 1, wherein the SCARA arm further includes a harvesting vision system mounted within the forearm of the SCARA arm, proximate the end effector, and wherein the harvesting vision system includes at least a camera and a lighting array.

8. The system of claim 7, wherein the camera includes a 3D camera and a multispectral camera, and wherein the lighting array is a multispectral lighting array.

9. The system of claim 1, wherein the images obtained from the trimming vision system are further provided as inputs to the control system so as to validate a prediction of mushroom maturity as determined by the control system based upon a set of images obtained by the harvesting vision system.

10. The system of claim 1, wherein the first robot further includes a box filling and handling system located adjacent the vertical conveyor, the box filling and handling system comprising a box conveyor and a box sensor for detecting the location of one or more boxes on the box conveyor, wherein the box filling and handling system conveys boxes filled with harvested mushrooms away from the vertical conveyor and conveys empty boxes towards the vertical conveyor so as to position said empty boxes adjacent the vertical conveyor for receiving harvested mushrooms from the vertical conveyor.

11. The system of claim 10, wherein the box conveyor further comprises:
   a load cell adjacent the vertical conveyor, the load cell in communication with the control system, wherein the load cell detects when the one or more boxes contain a target weight of harvested mushrooms and the control system outputs a control signal to convey the said one or more boxes containing the target weight of harvested mushrooms away from the vertical conveyor and to convey one or more empty boxes towards the vertical conveyor so as to position the one or more empty boxes adjacent the vertical conveyor so as to receive harvested mushrooms, and a room conveyance handling system, wherein the room conveyance handling system comprises at least an external conveyor bed located outside a mushroom growing room, a plurality of internal branch conveyor beds located inside the mushroom growing room and a central conveyor bed connected to the external conveyor bed and the plurality of internal branch conveyor beds, wherein the first robot is configured to releasably connect a box filling and handling system of the first robot to a branch conveyor bed of the plurality of branch conveyor beds, wherein the central conveyor bed receives filled mushroom boxes from the plurality of branch conveyor beds and conveys the filled mushroom boxes to the external conveyor bed located outside the mushroom growing room, and wherein the central conveyor bed receives empty mushroom boxes from the external conveyor bed and conveys the empty mushroom boxes to the plurality of branch conveyor beds so as to transfer the empty mushroom boxes to the box filling and handling system of the first robot.

12. The system of claim 1, wherein the elevator further comprises an apertured waste chute adjacent the vertical conveyor for deposit of a waste mushroom picked by the end effector into the waste chute so as to direct the waste mushroom to a waste bin, and wherein the waste chute includes a plurality of apertures, the plurality of apertures aligned with a plurality of shelves of the vertical growing rack so as to provide access to the waste chute by the end effector when performing picking operations at any shelf of the plurality of shelves of the vertical growing rack.

13. The system of claim 1, wherein the robot further comprises a tool change station, the tool change station comprising a tool rack having a plurality of slots for supporting a plurality of end effectors, and wherein the plurality of end effectors includes end effectors of different sizes for harvesting different sizes of mushrooms.

14. The system of claim 13, wherein the tool rack includes a rotating tool carousel for supporting the said plurality of end effectors.

15. The system of claim 13, wherein the tool change station further includes a cleaning nozzle for directing a stream of cleaning fluid at an interior surface of the end effector when the end effector is positioned over the cleaning nozzle.

16. The system of claim 15, wherein the cleaning fluid is selected from a group comprising: air, water, cleaning solution, and wherein the cleaning nozzle has a conical body and a plurality of apertures spaced apart across the surface of the conical body, and wherein, when the end effector is positioned over the cleaning nozzle, a plurality of cleaning fluid streams are ejected from the plurality of apertures so as to cleanse the interior surface of the end effector.

17. The system of claim 1, wherein a cleaning nozzle is mounted to the vertical carriage assembly proximate the SCARA arm for directing a stream of cleaning fluid at an interior surface of the end effector when the end effector is positioned over the cleaning nozzle.

18. The system of claim 17, wherein the cleaning fluid is selected from a group comprising: air, water, cleaning solution.

19. The system of claim 1, wherein the robot further includes a single point distance sensor for detecting a frame of the mushroom growing rack so as to avoid collision with the frame when moving the SCARA arm into and out of the mushroom growing rack.

* * * * *